(12) United States Patent  
Matsumoto et al.

(10) Patent No.: US 11,815,756 B2
(45) Date of Patent: *Nov. 14, 2023

(54) INFORMATION DISPLAY DEVICE

(71) Applicant: Panasonic Intellectual Property Management Co., Ltd., Osaka (JP)

(72) Inventors: Masaharu Matsumoto, Osaka (JP); Takeshi Hatakeyama, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/728,065

(22) Filed: Apr. 25, 2022

(65) Prior Publication Data

US 2022/0252930 A1 Aug. 11, 2022

Related U.S. Application Data

(63) Continuation of application No. 16/826,706, filed on Mar. 23, 2020, now Pat. No. 11,340,488, which is a
(Continued)

(51) Int. Cl.
*G02F 1/1335* (2006.01)
*B64D 11/00* (2006.01)
(Continued)

(52) U.S. Cl.
CPC ........ *G02F 1/133509* (2013.01); *B60K 35/00* (2013.01); *B60R 11/0235* (2013.01);
(Continued)

(58) Field of Classification Search
CPC ...... G06F 3/044; G06F 3/0412; G06F 1/1601; G06F 1/181; G09F 19/22; G09F 9/301;
(Continued)

(56) References Cited

U.S. PATENT DOCUMENTS 9,013,515 B2    4/2015  Joseph et al.
2004/0007906 A1 1/2004  Park et al.
(Continued)

FOREIGN PATENT DOCUMENTS

CN    203825589    9/2014
CN    207232925    4/2018
(Continued)

OTHER PUBLICATIONS

Communication pursuant to Article 94(3) EPC dated Mar. 23, 2022 in European Patent Application No. 20 164 501.7.
(Continued)

*Primary Examiner* — Muhammad N Edun
(74) *Attorney, Agent, or Firm* — Wenderoth, Lind & Ponack, L.L.P.

(57) ABSTRACT

An information display device attachable to a structure includes a display panel and a surface member. The display panel has a display surface and is configured to display information on the display surface. The surface member is a surface member disposed on a display surface side of the display panel, and has a larger surface area than the display panel. When the display panel is turned on, only the information displayed on the display surface of the display panel becomes visible through the surface member.

16 Claims, 25 Drawing Sheets

Related U.S. Application Data continuation of application No. 16/801,680, filed on Feb. 26, 2020.

(60) Provisional application No. 62/941,736, filed on Nov. 28, 2019, provisional application No. 62/916,808, filed on Oct. 18, 2019, provisional application No. 62/896,534, filed on Sep. 5, 2019, provisional application No. 62/876,777, filed on Jul. 22, 2019, provisional application No. 62/849,979, filed on May 20, 2019, provisional application No. 62/845,275, filed on May 8, 2019, provisional application No. 62/821,991, filed on Mar. 21, 2019.

(51) Int. Cl.
| | |
|---|---|
| *B60K 35/00* | (2006.01) |
| *B60R 11/02* | (2006.01) |
| *G02F 1/1333* | (2006.01) |
| *G06F 1/16* | (2006.01) |
| *G06F 1/18* | (2006.01) |
| *G06F 3/041* | (2006.01) |
| *G06F 3/044* | (2006.01) |
| *G09F 19/22* | (2006.01) |
| *H04N 21/414* | (2011.01) |
| *B60R 11/00* | (2006.01) |
| *G09F 9/33* | (2006.01) |
| *G09F 19/12* | (2006.01) |

(52) U.S. Cl.
CPC .... *B64D 11/0015* (2013.01); *B64D 11/00151* (2014.12); *G02F 1/133308* (2013.01); *G06F 1/1601* (2013.01); *G06F 1/181* (2013.01); *G06F 3/044* (2013.01); *G06F 3/0412* (2013.01); *G09F 9/335* (2021.05); *G09F 19/12* (2013.01); *G09F 19/22* (2013.01); *H04N 21/41415* (2013.01); *B60K 2370/1434* (2019.05); *B60K 2370/27* (2019.05); *B60K 2370/28* (2019.05); *B60K 2370/794* (2019.05); *B60R 2011/0012* (2013.01); *B60R 2011/0021* (2013.01)

(58) Field of Classification Search
CPC ...... G09F 9/33; G09F 19/06; G09F 2023/005; G09F 9/35; G09F 19/16; G09F 19/12; G09F 13/08; G02F 1/133509; G02F 1/133308; B60K 35/00; B60K 2370/27; B60K 2370/1434; B60K 2370/794; B60K 2370/28; B60R 2011/0012; B60R 11/0235; B60R 2011/0021; B64D 11/0015; B64D 11/00151; H04N 21/41415

See application file for complete search history.

(56) References Cited

U.S. PATENT DOCUMENTS

| | | | |
|---|---|---|---|
| 2005/0057526 | A1 | 3/2005 | Kinoshita et al. |
| 2006/0286371 | A1 | 12/2006 | Kim et al. |
| 2008/0285128 | A1 | 11/2008 | Nieuwkerk et al. |
| 2009/0015736 | A1 | 1/2009 | Weller et al. |
| 2009/0096937 | A1 | 4/2009 | Bauer et al. |
| 2009/0097145 | A1 | 4/2009 | Fujii et al. |
| 2009/0243824 | A1 | 10/2009 | Peterson et al. |
| 2010/0014319 | A1 | 1/2010 | Oversluizen et al. |
| 2011/0115731 | A1 | 5/2011 | Kuwajima |
| 2012/0139956 | A1 | 6/2012 | Joseph et al. |
| 2012/0274575 | A1 | 11/2012 | Solomon et al. |
| 2014/0022390 | A1 | 1/2014 | Blank et al. |
| 2014/0126036 | A1 | 5/2014 | Neuman et al. |
| 2014/0247543 | A1 | 9/2014 | Ozolins et al. |
| 2015/0153862 | A1 | 6/2015 | Nakamura et al. |
| 2015/0253612 | A1 | 9/2015 | Hasegawa et al. |
| 2016/0026039 | A1 | 1/2016 | Sakai et al. |
| 2016/0111028 | A1 | 4/2016 | Lee et al. |
| 2016/0292917 | A1 | 10/2016 | Dorner et al. |
| 2016/0360167 | A1 | 12/2016 | Mitchell et al. |
| 2017/0059917 | A1 | 3/2017 | Kao et al. |
| 2017/0082895 | A1 | 3/2017 | Sakai et al. |
| 2017/0092230 | A1 | 3/2017 | Kuwabara |
| 2018/0341293 | A1 | 11/2018 | Kim |
| 2018/0368270 | A1 | 12/2018 | Seo et al. |
| 2019/0004569 | A1 | 1/2019 | Jin et al. |
| 2019/0094434 | A1 | 3/2019 | Xu et al. |
| 2019/0381786 | A1 | 12/2019 | Watanabe |

FOREIGN PATENT DOCUMENTS

| | | |
|---|---|---|
| EP | 3007156 | 4/2016 |
| EP | 3244258 | 11/2017 |
| JP | 2002-23674 | 1/2002 |
| JP | 2002-140632 | 5/2002 |
| JP | 2002-156912 | 5/2002 |
| JP | 2005-18582 | 1/2005 |
| JP | 2005-74554 | 3/2005 |
| JP | 2008-111984 | 5/2006 |
| JP | 2007-34736 | 2/2007 |
| JP | 2008-208702 | 9/2008 |
| JP | 2009-294871 | 12/2009 |
| JP | 2010-20682 | 1/2010 |
| JP | 2011-107389 | 6/2011 |
| JP | 2011-145921 | 7/2011 |
| JP | 2012-88908 | 5/2012 |
| JP | 2012-118513 | 6/2012 |
| JP | 2014-77821 | 5/2014 |
| JP | 2014-199472 | 10/2014 |
| JP | 2015-11202 | 1/2015 |
| JP | 2015-106045 | 6/2015 |
| JP | 2015-132688 | 7/2015 |
| JP | 2015-232685 | 12/2015 |
| JP | 2016-161761 | 9/2016 |
| JP | 2016-206400 | 12/2016 |
| JP | 6122450 | 4/2017 |
| JP | 2019-56735 | 4/2019 |
| JP | 2019-152695 | 9/2019 |
| WO | 2007/072392 | 6/2007 |
| WO | 2008/012727 | 1/2008 |
| WO | 2008/104905 | 9/2008 |
| WO | 2014/050138 | 4/2014 |
| WO | 2016/183059 | 11/2016 |

OTHER PUBLICATIONS

Office Action dated Mar. 22, 2022 in U.S. Appl. No. 16/801,680.
Office Action dated Mar. 28, 2022 in U.S. Appl. No. 16/801,707.
Office Action dated Dec. 21, 2021 in U.S. Appl. No. 16/826,770.
Extended European Search Report dated Feb. 1, 2021 in European Patent Application No. 20194390.9.
Office Action dated Aug. 12, 2021 in U.S. Appl. No. 16/826,736.
Extended European Search Report dated May 3, 2021 in European Patent Application No. 20209744.0.
Extended Search Report dated Sep. 15, 2020 in European Patent Application No. 20159093.2.
Extended Search Report dated Sep. 17, 2020 in European Patent Application No. 20159505.5.
Extended Search Report dated Sep. 15, 2020 in European Patent Application No. 20164503.3.
Extended Search Report dated Sep. 24, 2020 in European Patent Application No. 20164501.7.
Extended Search Report dated Sep. 21, 2020 in European Patent Application No. 20164505.8.
Extended Search Report dated Sep. 22, 2020 in European Patent Application No. 20159092.4.
Office Action dated Aug. 22, 2022 in U.S. Appl. No. 17/105,838.

INFORMATION DISPLAY DEVICE

TECHNICAL FIELD

The present disclosure relates to an information display device including a display panel.

BACKGROUND

As an information display device including a display panel and a surface member, there is known an information display device that displays contents displayed on the display panel through the surface member (refer to Japanese Patent Unexamined Publication No. 2012-118513).

SUMMARY

It is possible to improve the designability of a space by covering the display panel with a surface member and displaying only the information to be displayed via the surface member on the wall without making the user feel the presence of the display panel. However, in order to make the display panel invisible through the surface member, it is necessary to suppress external light transmitted through the surface member, and when the light transmitted through the surface member from the display panel attenuates, there is a concern that it is difficult to see the information displayed on the display panel.

An information display device according to the disclosure aims to allow a user to see information from a display panel displayed on a surface member without being aware of the presence of the display panel.

An information display device according to the disclosure is an information display device attachable to a structure, and includes: a display panel that has a display surface and displays information on the display surface; and a surface member that is disposed on a display surface side of the display panel and has a surface area larger than that of the display panel. When the display panel is turned on, only the information displayed on the display surface of the display panel becomes visible through the surface member.

DESCRIPTION OF EMBODIMENTS

Hereinafter, embodiments will be described in detail with reference to the drawings as appropriate. However, there is a case where an unnecessary detailed description is omitted. For example, there is a case where the detailed description of a well-known item or a redundant description of substantially the same configuration is omitted.

In addition, the attached drawings and the following description are provided in order to enable those skilled in the art to fully understand the disclosure, and are not intended to limit the subject matter described in the claims.

In the following description, a "front surface side" or a "front side" of an information display device is a side on which ambient light or external light is incident or a side closer to a user who sees the information display device, unless otherwise specified. A "back surface side" or a "back side" is a side opposite to the "front surface side" or the "front side", and is a side where light of a display panel is emitted or guided.

In the information display device according to the disclosure, a surface member that covers the entirety or a part of a wall surface having a designability and light transmitting properties is disposed on a front surface of the display panel. The information display device according to the disclosure can realize a seamless design having no seam between a wall surface and an information display region, and can also realize an information display device having operability.

In the following description, a case where the information display device is used in an aircraft is employed as an example.

1. Embodiment 1

Figure 1:
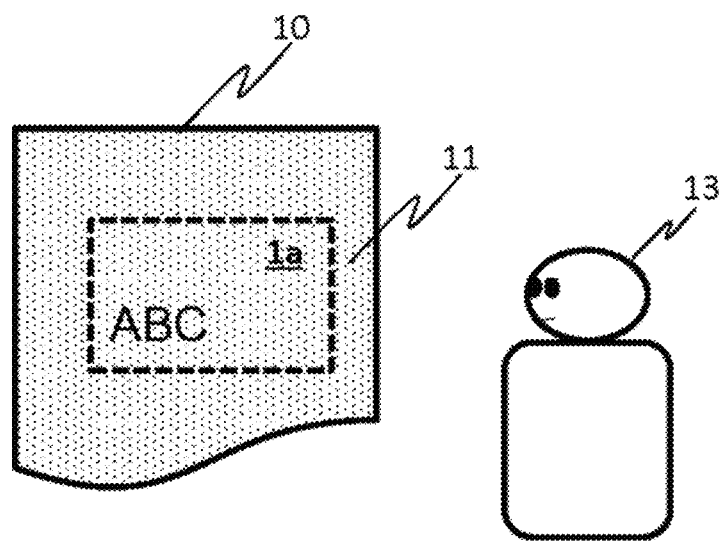
FIG. 1 illustrates a usage environment of an information display device according to Embodiment 1.

FIG. 1 illustrates a usage environment of information display device 1 according to the embodiment.

In the usage environment in the embodiment, information display device 1 is disposed on wall surface 10 which is a part of the interior of the aircraft. Information display device 1 transmits light of the display panel from the back side of surface member 11 and displays information (content information, character information, image, video, and the like) in display region 1a on surface member 11. User 13 can operate an operation screen displayed in display region 1a of surface member 11 to display and change information and make a request to a crew.

1-1. Configuration

Hereinafter, an outline of the configuration and operation of information display device 1 of the embodiment will be described with reference to FIGS. 2 and 3. Information display device 1 of the embodiment includes display device 20 installed behind surface member 11. Information such as contents or characters displayed on the display surface of display device 20 is displayed on the surface of surface member 11 through surface member 11 and presented to user 13.

Figure 2:
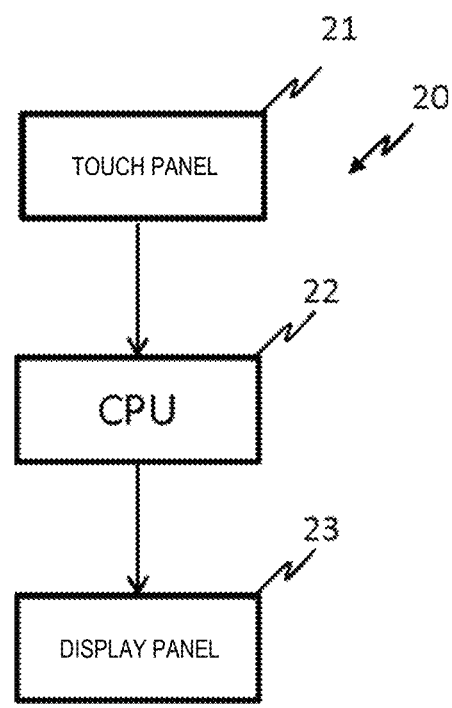
FIG. 2 illustrates a schematic configuration of a display device according to Embodiment 1.

FIG. 2 illustrates a schematic configuration of display device 20 of the embodiment. Display device 20 includes touch panel 21, CPU 22, and display panel 23. Touch panel 21 detects an input of user 13 via surface member 11 based on a change in electrostatic capacitance, pressure, or light, processes the input in CPU 22, and controls display device 20.

Touch panel 21 may be a touch sensor. The touch panel or the touch sensor is not essential as a configuration element of display device 20. In a case where there is no touch panel or a touch sensor, display device 20 cannot directly receive the operation from the user, but can display a logo or a symbol on wall surface 10 or use as lighting or the like hidden on wall surface 10.

Figure 3:
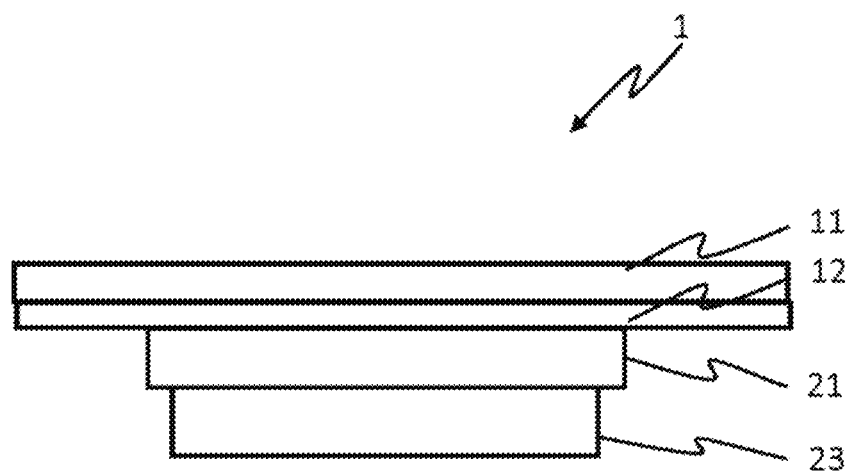
FIG. 3 is a schematic sectional view of the information display device according to Embodiment 1.

FIG. 3 is a schematic sectional view of information display device 1 of the embodiment. Information display device 1 includes surface member 11, reflection member (half mirror) 12, touch panel 21, and display panel 23.

Surface member 11 is a member disposed on the surface of the wall in the aircraft cabin, and is a surface member that covers a part or the entirety of a wall, a floor, an armrest, and a table of a seat shell. The range in which the information is displayed through surface member 11 is a range that is reached by the hand when the user is in operation, a range (including, for example, a bedside) reached by the line of sight from a passenger in order to deliver the information to the passenger, and further, a range reached by the line of sight from the crew (cabin attendant).

Surface member 11 is a material having a certain level of translucent properties, and has a plate or film shape. A surface area of surface member 11 is configured to be larger than the display area of display panel 23. The material of surface member 11 is a material having the same or similar surface to that of the material that covers the surface of wall surface 10. By embedding display panel 23 in wall surface 10 and covering the display panel with surface member 11, information can be displayed on wall surface 10 without making user 13 aware of the presence of display panel 23. Further, by making the surface area of surface member 11 larger than the display area of display panel 23, display region 1a of display panel 23, that is, the border or outer edge of the display area of display panel 23 becomes difficult to be visually recognized from the user. In addition, by covering the entire wall surface 10 with surface member 11, it is possible to completely eliminate the seam around display panel 23.

Accordingly, user 13 can be made unaware of the presence of display panel 23. Surface member 11 is made of a genuine material such as wood, cloth, leather, stone, or the like, a film material simulating the genuine material, or a transparent or translucent material of which a surface is decorated by painting or printing, and accordingly, it is possible to display information without making the user feel the presence of display panel 23 from the appearance.

Surface member 11 may be configured to partially have light transmitting properties, not to transmit light to other area, and to display only necessary areas. For example, by providing a part having light transmitting properties in a specific symbol shape, a clearer symbol can be displayed. The light transmittance of surface member 11 is, for example, 8% to 15%. Since surface member 11 is configured to have such a light transmittance, the light transmitted from the front side to the back side of surface member is suppressed such that display panel 23 itself becomes invisible from the outside, and it is possible to make the display by display device 20 sufficiently visually recognizable even through surface member 11.

Surface member 11 may have a certain hard coating (not illustrated) on the side opposite to the side (back side) where display panel 23 is present, that is, on the front side. The user frequently touches the front side of surface member 11 for operation using touch panel 21. In particular, in a case where information display device 1 is used in equipment and the like in the aircraft, an unspecified number of people perform a touch operation. Accordingly, it is preferable that the hard coating has a hardness of, for example, 2H (JIS standard) or higher. Thereby, damage can be prevented. The hard coating may be a thin layer to keep the feeling of surface member 11. The hard coating has a thickness of, for example, 5 to 20 μm.

Reflection member 12 is a material such as a half mirror, and has a characteristic of reflecting external light but transmitting light from display panel 23 on the inside. By inserting reflection member 12 between surface member 11 and display panel 23, the boundary between wall surface 10 and the display region can be made more difficult to be seen. While the presence of display panel 23 itself is prevented from being seen through surface member 11 by the external light reflection characteristic of reflection member 12, the display contents of display panel 23 can be presented to the user by the characteristic of transmitting the light of reflection member 12.

In addition, when surface member 11 has a sufficient external light reflection characteristic and a light transmission characteristic of the internal light source emitted from display panel 23, reflection member 12 may be omitted.

Surface member 11 and reflection member 12 may be formed of an insulator such that touch panel 21 can be operable. In this case, the sheet resistance is preferably higher. This is because, when there is no sufficient resistance value, false recognition or the like of a touch detection position on touch panel 21 is induced. In order to sufficiently ensure the performance of touch panel 21, it is preferable that surface member 11 and reflection member 12 have a sheet resistance value of, for example, 30 megaohms or more.

Reflection member 12 may be formed by a metal vapor-deposited film that can transmit electromagnetic waves or a film that can produce a metallic luster by laminating a resin material. In this case, an indium-deposited film, a film formed by laminating a PET material, or the like is preferable. Accordingly, it becomes easy to ensure both the performance of touch panel 21 and to hide display panel 23.

Display device 20 may have functions, such as wireless charging, near field communication (NFC), and lighting, behind wall surface 10 instead of touch panel 21 or in addition to touch panel 21. With such a configuration, it is possible to expect an effect of enhancing convenience for the user or the maintenance person, and enhancing a presentation effect of displaying information.

Since the surface member is arranged on the front surface, it is preferable that the touch panel 21 is configured by using a capacitance type in particular. In general, for displays with a size of 15 inches or less, a sensor pitch of about 5 mm is usually selected for capacitive touch sensor. However, in order to detect the touch operation through the thickness of the surface member as in the present embodiment, it is preferable to set the sensor pitch to 6 mm or more, preferably 6 mm to 10 mm. Also, on the input screen provided to the user, it is preferable to use icons of 3 cm square or more for each button. This is because the detection accuracy is reduced due to the large sensor pitch.

With these settings, even when the touch operation by the user's finger or the like is performed from the front side of the surface member 11, the operation can be sufficiently detected, and a natural operation feeling can be provided to the user.

Display panel 23 is, for example, a liquid crystal display. Display panel 23 includes a color filter, a liquid crystal panel, and a light source such as an LED (any of these is not illustrated). A display image including predetermined information, the color of background, or a pattern is displayed to be visible on surface member 11 by light BL from a light source such as an LED. Display panel 23 may be either a non-light-emitting display having a light source or a light-emitting display. As display panel 23, an OLED display, a matrix LED display, or other display devices provided with other light sources may be used.

Display panel 23 is adjusted such that the screen luminance after transmission through surface member 11 is 200 cd/m$^2$ or less preferably about 80 cd/m$^2$ when the display panel 23 is turned on. Accordingly, from the front side of surface member 11, while display panel 23 itself becomes invisible from the outside, it is possible to make the display by display panel 23 sufficiently visually recognizable even through surface member 11, and to prevent the display panel from being overly dazzled.

In order to hide the display panel 23 and the bezel around the display panel 23 from the front side of the surface member 11, the total visible light transmittance of the surface member 11 and the reflecting member 12 is assumed to be 8% to 15%, preferably around 10%. In addition, in order to make the display on the surface member 11 to be 200 cd/m$^2$ or less, preferably about 80 cd/m$^2$, the screen brightness of the display panel 23 itself may be adjusted to 800 cd/m$^2$ or more preferably 1,000 cd/m$^2$.

1-2. Behavior

When the power of information display device 1 is turned on, display panel 23 is illuminated to display information on the display surface. At this time, only the information displayed on the display surface is visible to the user through surface member 11. Meanwhile, when the power of information display device 1 is turned off, display panel 23 is turned off. At this time, display panel 23 becomes hardly seen from the user through surface member 11, that is, invisible. In addition, even when the power of information display device 1 is turned on and display panel 23 is illuminated, an area (background color area) of the display on which information is not displayed becomes hardly seen from the user via surface member 11, that is, invisible.

In a case where information display device 1 is used in an aircraft, as the information or the contents of the operation presented to user 13 (for example, a passenger or a crew), for example, transit information, seat lighting control, audio control, and DO NOT DISTURB setting, entertainment equipment control, seat reclining, attendant call and cancellation thereof, weather information, information on flight time or local time, presentation of seat number, display of lavatory availability, seat belt sign, door mode state display, and the like can be considered. Further, a function to turn off or to adjust brightness of the display of wall surface 10.

Accordingly, in a narrow space such as a space around a seat in the aircraft, the user can be provided with a control unit such as seat reclining, air conditioning, and lighting while maintaining a simple and high-quality design in which there is no prominent display terminal or operation terminal. A controller having multiple functions or a function as a terminal for displaying information can be imparted to the wall having a designability.

In addition, since there are no physical buttons on the wall surface, when considering a usage by many and unspecified users, there is no case where malfunction is caused by spilling liquids such as juice, and it is possible to easily clean up since there is no unevenness.

Further, since an operation screen or information is displayed on wall surface 10 that appears to be empty for user 13 as necessary, it is possible to give user 13 a surprise. In particular, by expressing combination with surface member 11, for example, it is possible to make the wood look protruded, or to make it look as if there are an object that is not actually present or an imaginary object on the wall, and a spatial presentation for user 13 is also possible.

1-3. Characteristics

In information display device 1 according to the embodiment, surface member 11 having a designability and light transmitting properties is disposed in front of display panel 23, and surface member 11 covers the entire wall surface 10 or at least a surface larger than display panel 23. When using information display device 1 according to the embodiment, it is possible to realize a seamless design having no seam between wall surface 10 and the information display region. Accordingly, it is possible to provide a user with an information display device in which characters, images, and the like appear on wall surface 10 and through which the user can perform an action such as an operation.

In addition, when the design permits, there may be a boundary between surface member 11 that covers display panel 23 and the other part of wall surface 10. In this manner, it is possible to simply perform removal from the viewpoint of maintenance properties and the like.

Information display device 1 according to the embodiment can also have the following configuration.

Modification Example 1-1

Figure 4:
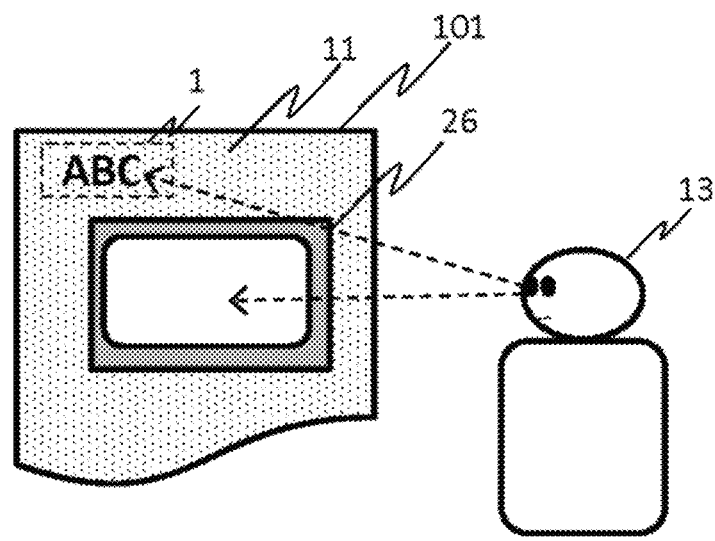
FIG. 4 illustrates a usage environment of an information display device according to a modification example of Embodiment 1.

FIG. 4 illustrates a usage environment of information display device 1 according to the modification example.

In the usage environment according to the modification example, information display device 1 is disposed on seat 101. Information display device 1 according to the modification example is installed in the vicinity of the periphery of seat monitor 26 and displays information at a position that can be seen from user 13 (for example, a passenger) without largely moving the line of sight from seat monitor 26. Accordingly, it is possible to realize an information display device which is easy to use and capable of minimizing the operation of the line of sight and neck of user 13. The basic operation of information display device 1 according to the modification example is the same as that of the Embodiment 1 described above.

Figure 5:
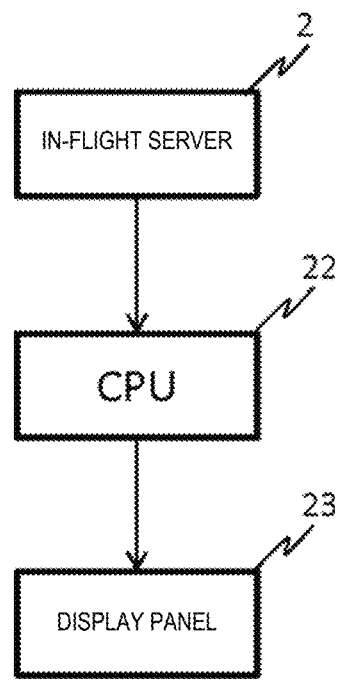
FIG. 5 is a configuration view of a system for operating the information display device according to the modification example.

FIG. 5 is a configuration view of a system for operating information display device 1 according to the modification example. CPU 22 control display panel 23 disposed around seat monitor 26 to display necessary or useful information for the user based on the information from in-flight server 2. For example, the information includes a fasten seat belt sign, information on the availability of lavatory, information on flight time, and the like.

With the above-described operation, in the modification example, it becomes possible to present an operation screen at a position that is easily seen from user 13, to make the operator aware, or to realize an information display device that is more easily used.

Modification Example 1-2

Figure 6:
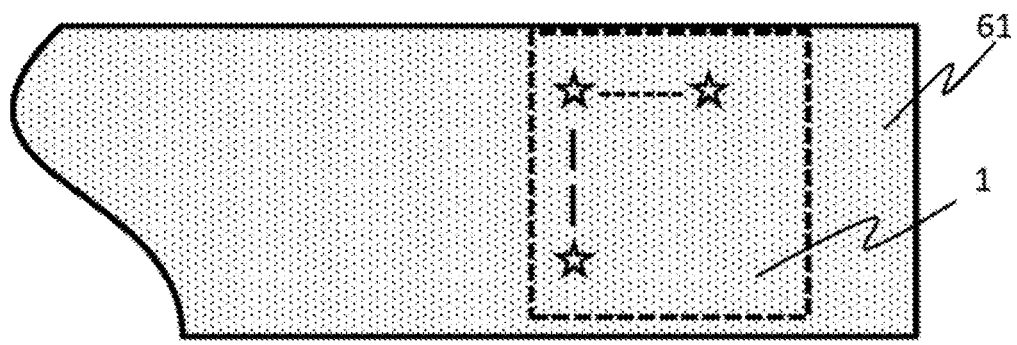
FIG. 6 illustrates a usage environment of an information display device according to another modification example of Embodiment 1.
Figure 6:
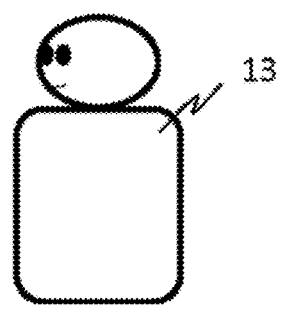

FIG. 6 illustrates a usage environment of information display device 1 according to the modification example.

In the usage environment according to the modification example, information display device 1 is disposed on ceiling 61. Information display device 1 is installed on a ceiling of a cabin or ceiling 61 of a seat compartment, and can display a starry sky as if user 13 is under an outdoor sky, or can display an advertisement. Accordingly, it is possible to realize an information display device that can alleviate the psychological tension and the like that user 13 receives in a narrow space in the cabin, and can effectively provide an advertisement. The basic operation of the information display device according to the embodiment is the same as that of Embodiment 1.

Figure 7:
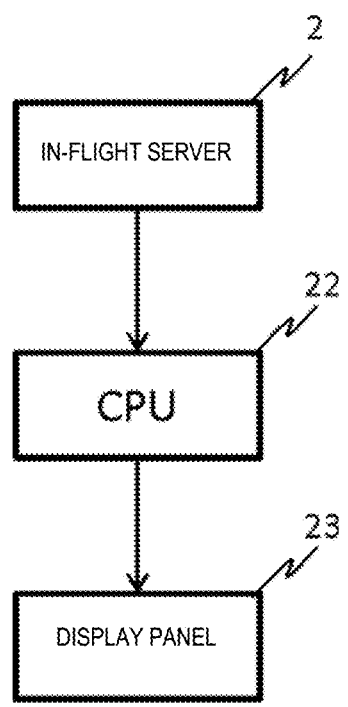
FIG. 7 is a configuration view of a system for operating the information display device according to the modification example.

FIG. 7 is a configuration view of a system for operating information display device 1 according to the modification example. CPU 22 displays a night sky or blue sky video or an advertisement on the ceiling on display panel 23 based on information from in-flight server 2. Depending on the information to be displayed, connection to in-flight server 2 may not be required.

With the above-described operation, in the modification example, it becomes possible to realize an information display device that alleviates the tension of the user and gives the user a surprise.

Figure 8:
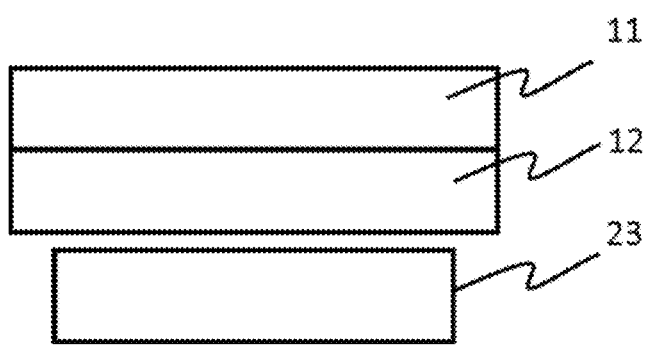
FIG. 8 is a schematic sectional view of the information display device according to the modification example.

FIG. 8 is a schematic sectional view of information display device 1 according to the modification example. The information display device includes surface member 11, reflection member (half mirror) 12, and display panel 23, and does not include a touch panel since no touch screen operation is required.

Modification Example 1-3

Figure 9:
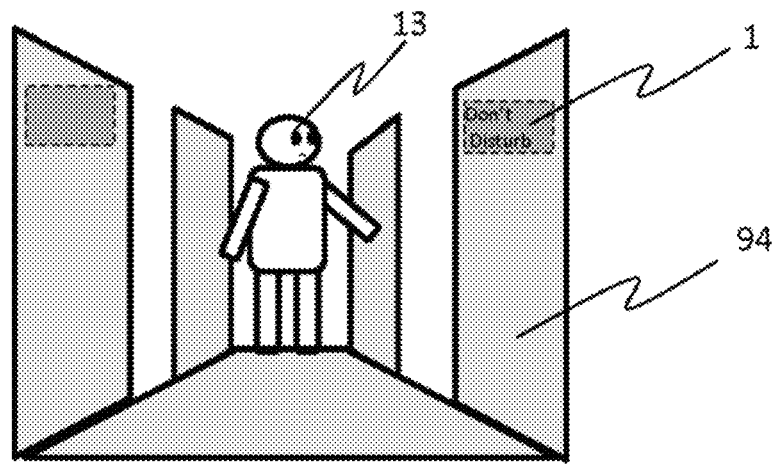
FIG. 9 illustrates a usage environment of an information display device according to another modification example of Embodiment 1.

FIG. 9 illustrates a usage environment of information display device 1 according to the modification example.

In the usage environment according to the modification example, information display device 1 displays information mainly for crew 93 such as a cabin attendant, which is disposed on wall surface 94 of a cabin wall of the seat compartment. Information display device 1 according to the modification example can display a sign at a position that can be seen by crew 93 from a passage or via a camera image. Accordingly, as described in the related art, without interfering with the sense of luxury by disposing a display for displaying or a lamp on a passage, a wall, or a ceiling in the cabin, it is possible to reduce the load on crew 93 or to improve service for the passengers. The basic operation of the information display device according to the embodiment is the same as that of Embodiment 1.

The wall surface 94 may be a floor, a ceiling, or a wall surface of a door of a seat compartment.

Figure 10:
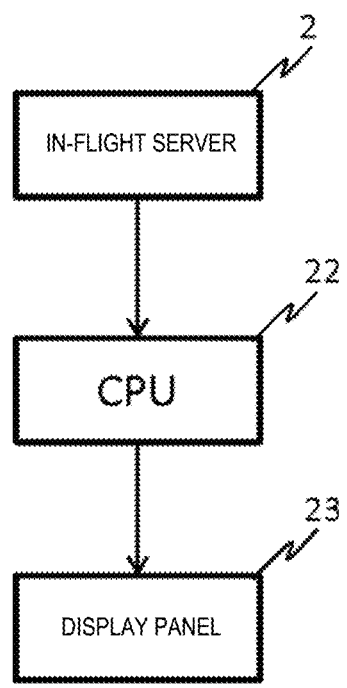
FIG. 10 is a configuration view of a system for operating the information display device according to the modification example.

FIG. 10 is a configuration view of a system for operating information display device 1 according to the modification example. CPU 22 displays an attendant call, a DON'T DISTURB sign, a seat number, and the like on display panel 23 based on information from in-flight server 2. Depending on the information to be displayed, connection to the in-flight server may not be required.

By the above-described operation, in the modification example, it is possible to realize an information display device that can reduce the workload on the crews 93 or improve the service for the passengers without interfering with the sense of luxury.

As one of usages of information display device 1 according to the modification example, the passenger name and the seat number may be displayed at the seat compartment entrance at the time of boarding and the like, and the seat number and the passenger name may not be displayed at other times. Accordingly, while improving the convenience of the passengers when boarding, the original decorative wall surface can be used without displaying the seat number or the passenger name at other times. As a result, it is possible to maintain a sense of luxury as a space while considering the privacy of passengers.

Figure 11:
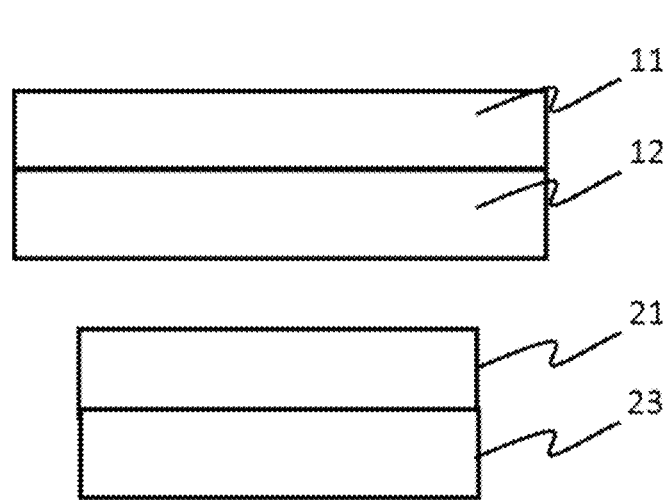
FIG. 11 is a schematic sectional view of the information display device according to the modification example.

FIG. 11 is a schematic sectional view of information display device 1 according to the modification example. Information display device 1 includes surface member 11, reflection member (half mirror) 12, touch panel 21, and display panel 23, and each member is the same as those in Embodiment 1. Further, similar to Embodiment 1, information display device 1 may not include reflection member 12 and/or touch panel 21.

Modification Example 1-4

Figure 12:
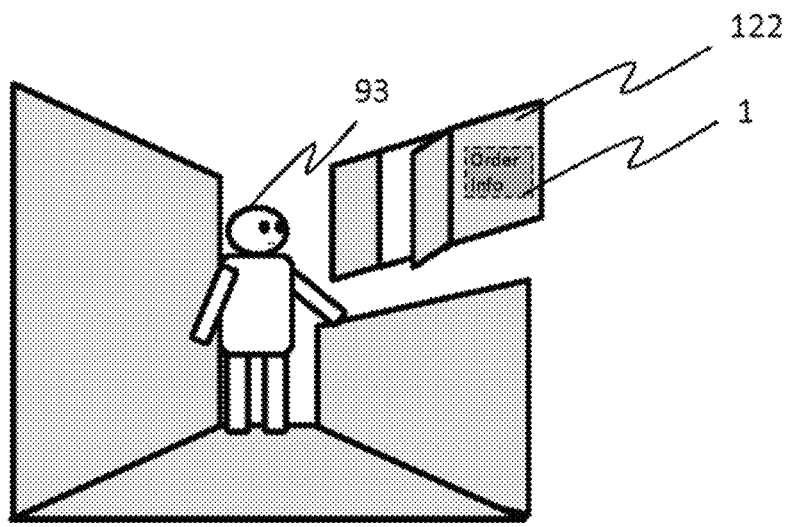
FIG. 12 illustrates a usage environment of an information display device according to another modification example of Embodiment 1.

FIG. 12 illustrates a usage environment of information display device 1 according to the modification example.

In the usage environment according to the modification example, information display device 1 is disposed on a wall surface of a work area of crew 93, such as a galley in an aircraft, or on door surface 122 of a container. Information display device 1 can display information at a position where crew 93 can see the information while working. Until now, it was necessary for crew 93 to confirm requests, orders, and the like from each seat using an information terminal (not illustrated) near the door. However, according to information display device 1 according to modification example, crew 93 can grasp requests from each seat and input a response status while performing the work of serving and preparing, and can improve work efficiency. Furthermore, an information display device can be realized without deteriorating the sense of luxury of the galley used as a sales space these days. The basic operation of the information display device according to the embodiment is the same as that of Embodiment 1.

Door surface 122 may be a wagon door or a wall surface which are disposed on a floor, a ceiling, or a galley.

Figure 13:
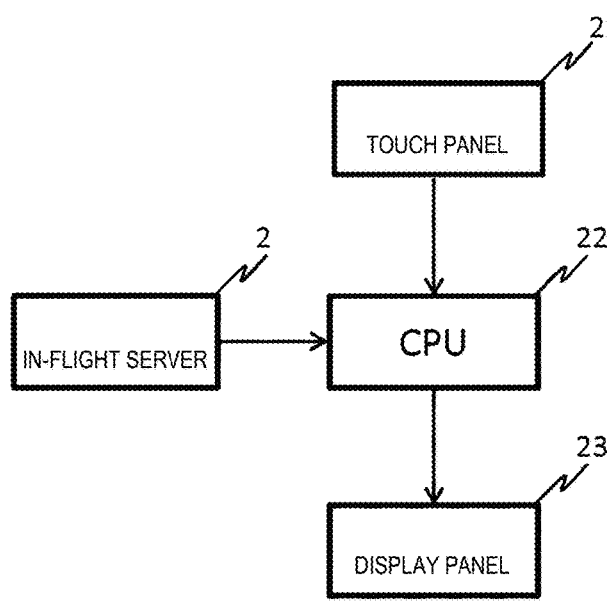
FIG. 13 is a configuration view of a system for operating the information display device according to the modification example.

FIG. 13 is a configuration view of a system for operating information display device 1 according to the modification example. CPU 22 controls display, on display panel 23, the order of drinks, request for blankets, and the like from the passenger, call information, status of the request (response history), and the like, with the accompanying seat number, and the like, based on the information from in-flight server 2. Crew 93 can operate touch panel 21 to input necessary information. Depending on the information to be displayed, connection to the in-flight server may not be required.

By the above-described operation, in the modification example, it is possible to realize an information display device capable of reducing the work load on crew 93 or improving the service for the passengers without interfering with the sense of luxury in the galley.

By forming information display device 1 according to the modification example to be thin, it is possible to make effective use of the space of the container.

Figure 14:
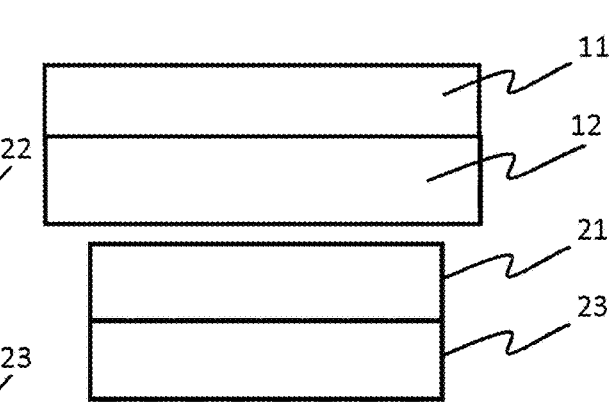
FIG. 14 is a schematic sectional view of the information display device according to the modification example.

FIG. 14 is a schematic sectional view of information display device 1 according to the modification example. Information display device 1 includes surface member 11, reflection member (half mirror) 12, touch panel 21, and display panel 23, and each member is the same as those in Embodiment 1. Further, similar to Embodiment 1, information display device 1 may not include reflection member 12 and/or touch panel 21.

Surface member 11 can be formed of a waterproof material. Accordingly, it is possible to realize a convenient information display device that can be safely operated even in a case of using water in the work area of crew 93.

Modification Example 1-5

Figure 15:
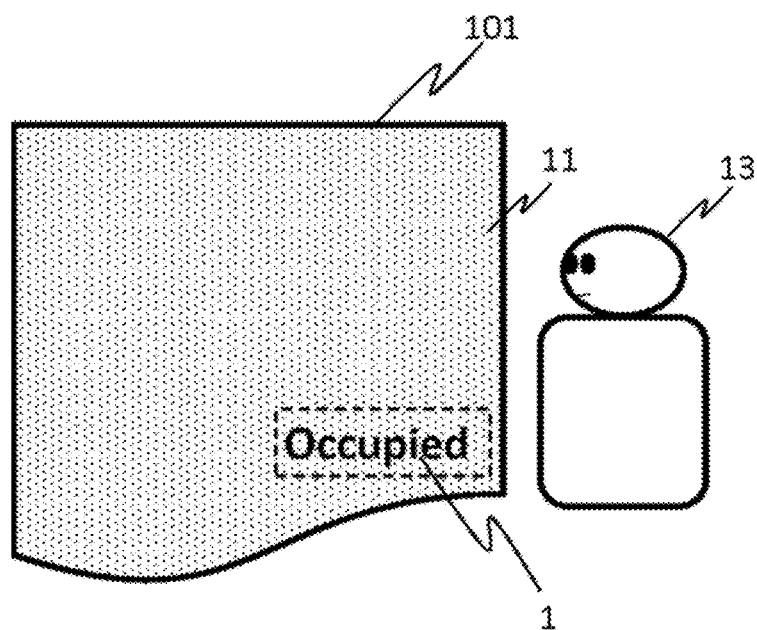
FIG. 15 illustrates a usage environment of an information display device according to another modification example of Embodiment 1.

FIG. 15 illustrates a usage environment of information display device 1 according to the modification example.

In the usage environment according to the modification example, information display device 1 is disposed, for example, on seat 101 or the wall of the seat compartment. Information display device 1 is disposed at a position that is difficult to be seen or invisible to a third party (other passenger or crew and the like), such as a lavatory availability sign. Although seat 101 or the wall of the seat compartment is a wall that usually give a sense of luxury, the availability of the lavatory is displayed such that only user 13 can understand in a case where a desire for excretion is felt. There are many cases where the display sign indicating the vacancy of the lavatory is installed on the upper area of the wall in the related art, but by installing information display device 1 at a place where the line of sight easily reaches in seat 101 or the compartment, user 13 can understand the state of the lavatory without greatly moving the line of sight or the neck, and an effect of enhancing convenience of the user is expected. In addition, when the availability of the lavatory is constantly displayed, the sense of luxury or designability deteriorates, but information display device 1 according to the modification example does not make the user feel the presence of the device while the device is unnecessary and the information can be seen only to the user regarding the contents that are not known to a third party such as other passengers.

Figure 16:
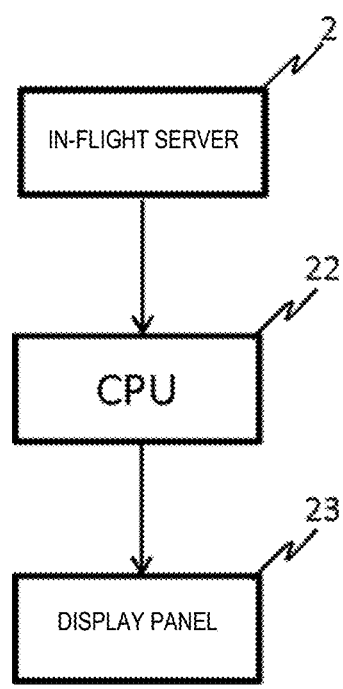
FIG. 16 is a configuration view of a system for operating the information display device according to the modification example.

FIG. 16 is a configuration view of a system for operating information display device 1 according to the modification example. CPU 22 controls display panel 23 to display the availability of the lavatory and the like based on the information from in-flight server 2. Depending on the information to be displayed, connection to the in-flight server may not be required.

Modification Example 1-6

Figure 46:
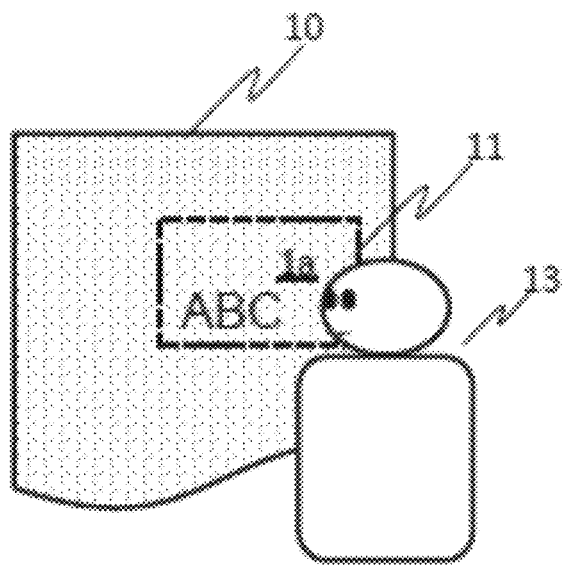
FIG. 46 illustrates a usage environment of an information display device according to another modified example of Embodiment 1.

FIG. 46 illustrates a usage environment of information display device 1 according to the modification example.

In the usage environment according to the modification example, information display device 1 is disposed, for example, on seat 101 or the wall of the seat compartment. Information display device 1 is disposed at a position within a distance of 50 cm around the user's face. Normally, since the information display monitor emits light by itself, it is dazzling to the user when it is placed around the face, and there will be a problem that sleep is disturbed, for example. In addition, the heat of the monitor is transmitted to the user, which may cause discomfort.

However, since the display device is arranged behind the surface member 11 in the information display device 1, information can be displayed from the vicinity without giving discomfort to the user in terms of brightness and temperature. Therefore, at the time such as at night, it is possible to present the information without giving discomfort to the user even in the vicinity of the face. The vicinity of the face here is higher than the position of the user's shoulder and forward of the position of the ear, and is a distance within 50 cm from the side of the cheek and the eyes around the face as starting points is assumed. Similarly, when the user puts the backrest of the seat down to the bed mode, that is, even when the information is displayed at the position where the user can see directly when the user takes the sleeping posture, the user may not feel uncomfortable.

2. Embodiment 2

Figure 17:
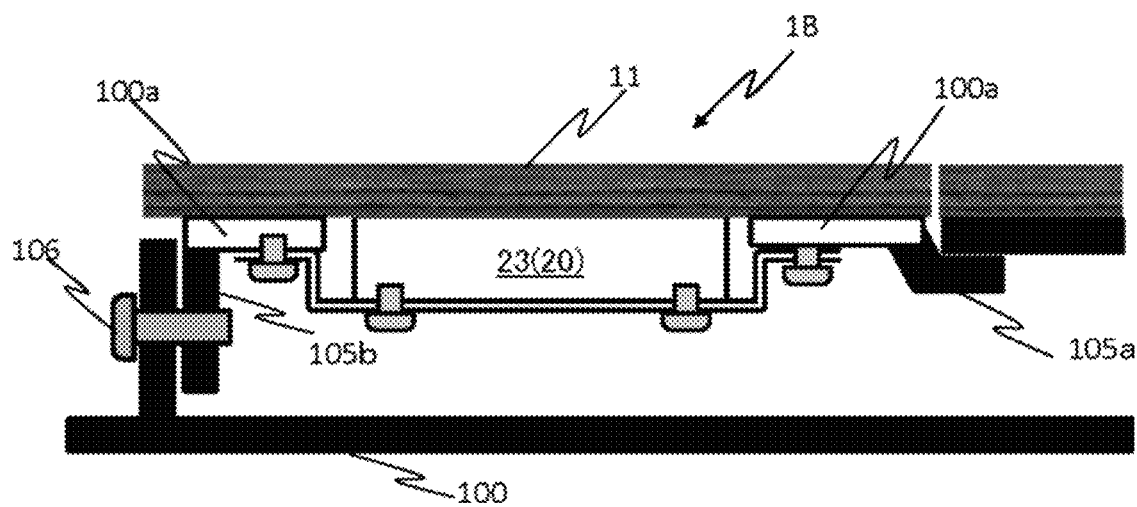
FIG. 17 is a schematic sectional view of an information display device according to Embodiment 2.

In the embodiment illustrated in FIG. 17, information display device 1B including surface member 11 and display device 20 has an attachment feature to cabin structure (wall, door, monument and the like) 100.

Information display device 1B is used in any usage environment similar to the above-described embodiment. The description of information display device 1B having the same configuration and function as those of the above-described embodiment will be omitted, and the same reference numerals will be given to the same configuration members.

The attachment feature includes a structural body 100a, and structural body 100a has retainers 105a and 105b. Structural body 100a is attached to the back side of surface member 11 at a position that does not overlap the display area of display panel 23. Retainers 105a and 105b are provided on the back side and/or the side portion of structural body 100a or surface member 11 at positions that are invisible from the front side of surface member 11, and retain information display device 1B to structure 100. Retainers 105a and 105b and/or other locations are fixed with screws 106 and the like.

Retainers are preferably provided on at least one side, and more preferably provided on a plurality of sides in different directions similar to retainers 105a and 105b illustrated in FIG. 17.

At least surface member 11 side of structural body 100a is colored with substantially the same color (for example, black) as the background color of the display surface when display panel 23 is turned off or turned on. Accordingly, it is possible to prevent the boundary between structural body 100a and display panel 23 from being seen through surface member 11.

Information display device 1B can be configured to be easily detached from and attached to structure 100, and an information display device that is easy to maintain can be realized. For example, a configuration in which the fixing on retainer 105b side among retainers illustrated in FIG. 17 is released and information display device 1B is attached or detached by rotating information display device 1B with retainer 105a as a fulcrum can also be employed.

Desirable performances for the display and touch panel used in this embodiment are the same as those described in the first embodiment.

3. Embodiment 3

Figure 18:
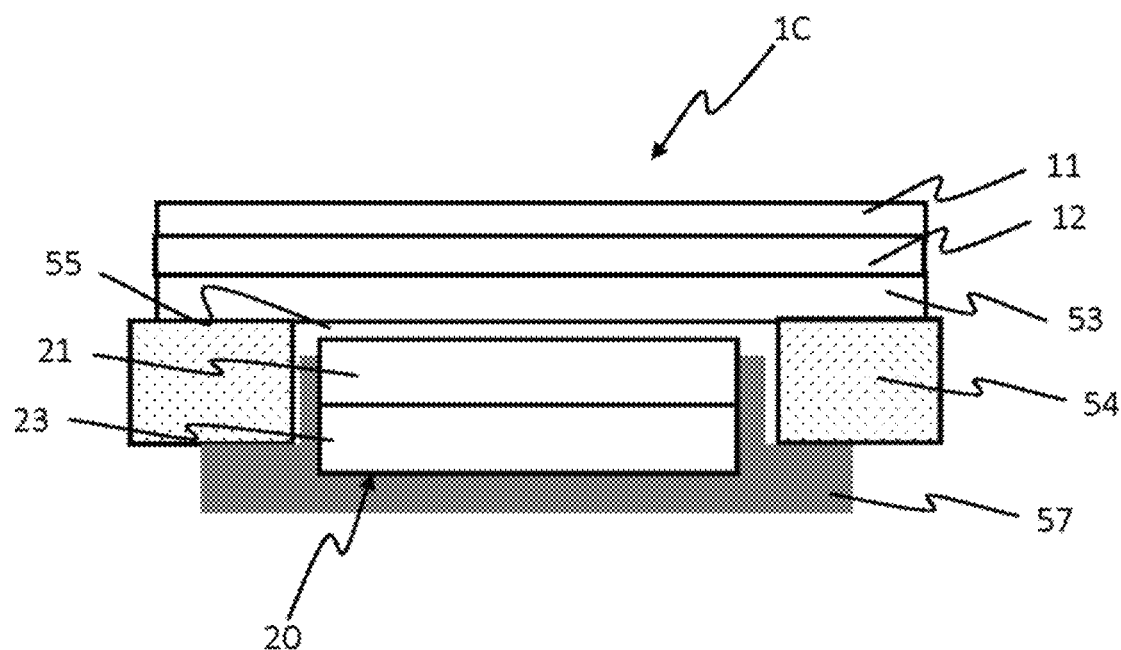
FIG. 18 is a schematic sectional view of an information display device according to Embodiment 3.

Information display device 1C according to the embodiment illustrated in FIG. 18 has a configuration in which an integrated unit of a film having a designability and light transmitting properties and a transparent fixing plate on the front side of display panel 23 is pressed. With such a configuration, it is possible to display and operate information as necessary while realizing a seamless design, and to make system maintenance easy.

Information display device 1C is used in any usage environment similar to those of the above-described embodiments. The description of information display device 1C having the same configuration and function as those of the above-described embodiments will be omitted, and the same reference numerals will be given to the same configuration members.

FIG. 18 is a schematic sectional view of information display device 1C of the embodiment. Information display device 1C includes surface member 11, reflection member (half mirror) 12, transparent member 53, structural body 54, touch panel 21, display panel 23, and housing 57. In order to sufficiently exhibit the effect of hiding the presence of display panel 23 and the effect of reflection member 12 for transmitting the contents displayed by display panel 23 and displaying the contents on surface member 11, it is preferable that reflection member 12 is disposed at a position close to surface member 11. This is because, when there is a gap between reflection member 12 and surface member 11, there is a possibility that the light from display panel 23 transmitted through reflection member 12 is diffused and displayed on surface member 11 with blur. However, in a case where the requirement for display quality is not so high, the positions of reflection member 12 and transparent member 53 may be reversed. As long as the function as the information display device is satisfied, the order of the disposition may be any order.

Surface member 11 may not have a surface area larger than that of display panel 23.

Transparent member 53 is a plate having a certain hardness. Transparent member 53 is preferably as thin as possible in order to reduce the blur of the display on surface member 11, for example, approximately 0.4 mm to 2.0 mm and more preferably approximately 1.5 mm to 2.0 mm.

In order to make touch panel 21 operable, it is preferable that surface member 11 and reflection member 12 are formed by an insulator similar to Embodiment 1. Further, for the same reason, it is preferable that transparent member 53 is also similarly an insulator and has a sheet resistance value of 30 megaohms or more.

The height of structural body 54 is preferably formed such that space 55 is as small as possible. This is because, by shortening the distance between display panel 23 and reflection member 12 and surface member 11, diffusion of light can be suppressed, and the blur of display on surface member 11 can be minimized. Space 55 is preferably as small as possible. Preferably, a state where touch panel 21 is press fitted against transparent member 53 without any gap, for example, a state of 0 mm or a state close thereto is preferable.

Housing 57 is fixed to structural body 54 by fixing units such as screws. By fixing transparent member 53 to structural body 54, surface member 11 and reflection member 12 can be installed on the display surface side of display panel 23. Accordingly, information display device 1C can be configured without directly pasting surface member 11 or reflection member 12 to touch panel 21 or display panel 23. However, in a case where surface member 11 or reflection member 12 alone has sufficient strength, transparent member 53 can be omitted.

With the above-described configuration, information display device 1C according to the embodiment can be disposed without making the user feel the position and the presence of display panel 23. Further, in information display device 1C, surface member 11, reflection member 12, and transparent member 53 can be collectively detached from structural body 54. Accordingly, without taking off the entire wall on which information display device 1C is attached, only display panel 23 or touch panel 21 can be detached, and display 56 can be easily accessed and can be repaired or replaced. Further, after the repair or the replacement of information display device 1C, surface member 11, reflection member 12, and transparent member 53 can be reused.

Desirable performances for the display and touch panel used in this embodiment are the same as those described in the first embodiment.

4. Embodiment 4

In information display device 1D according to the embodiment, at least the front surface of structural body 54 and/or a region (a region that surrounds the display surface) other than the display surface of display panel 23 between display panel 23 and surface member 11, have a colored layer colored with substantially the same color (for example, black) as the background color of the display surface when display panel 23 is turned off or turned on. Hereinafter, examples of such a colored layer will be specifically described.

Information display device 1D is used in any usage environment similar to the above-described embodiment. The description of information display device 1D having the same configuration and function as those of the above-described embodiments will be omitted, and the same reference numerals will be given to the same configuration members.

Information display device 1D according to the embodiment is different from Embodiment 3 in that mask print layer 83 (an example of the colored layer) is provided at least a part other than the display surface of display panel 23. With this configuration, it is possible to prevent see-through of a part having no display panel 23, and when viewed from the front surface side of surface member 11, the display surface of display panel 23 and other regions are made the same, it is possible to make it difficult to see display panel 23.

Figure 19:
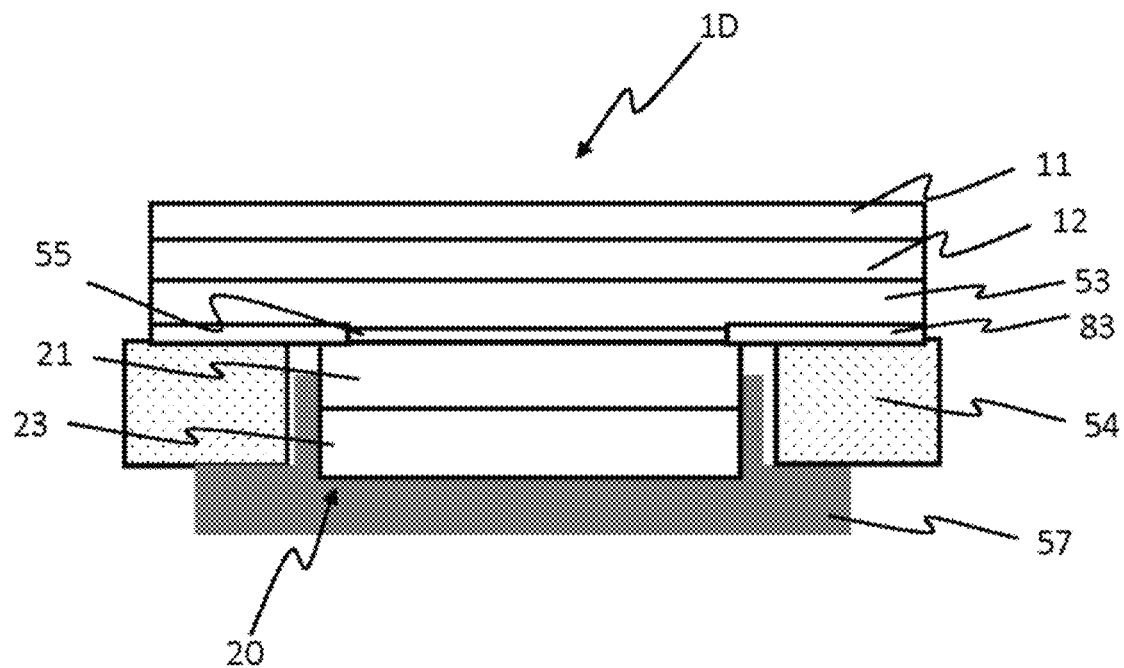
FIG. 19 is a schematic sectional view of an information display device according to Embodiment 4.

FIG. 19 is a schematic sectional view of information display device 1D of the embodiment. Information display device 1D includes surface member 11, reflection member (half mirror) 12, transparent member 53, mask layer 83, structural body 54, touch panel 21, display panel 23, and housing 57. The function of information display device 1D is satisfied even when reflection member 12 is disposed between transparent member 53 and mask layer 83.

Housing 57 is fixed to structural body 54 by fixing units such as screws. By fixing transparent member 53 to structural body 54, surface member 11 or reflection member 12 can be installed on the display surface side of display panel 23. Accordingly, information display device 1C can be configured without directly pasting surface member 11 or reflection member 12 to touch panel or display panel 23.

However, in a case where such a configuration is employed, while the region where display panel 23 is located transmits light, the region where structural body 54 is located does not transmit light on the surface of surface member 11, and accordingly, the boundary part between display panel 23 and structural body 54 is visible. In order to prevent this, in the embodiment, mask layer 83 is disposed at the boundary part.

Mask layer 83 is disposed so as to surround the display surface of display panel 23. Mask layer 83 is preferably colored with substantially the same color as the background color of a region other than the region that displays the information, which is a display surface of display panel 23 when display panel 23 is turned off or when display panel 23 is turned on. Accordingly, the boundary between display panel 23 and structural body 54 can be made prominent through surface member 11.

The region where mask layer 83 is provided is preferably provided not only on structural body 54 but also on a region excluding the region of the display surface where display panel 23 displays information. In particular, the part having no mask layer 83 may be smaller than the entire region of display panel 23 such that the region where mask layer 83 is provided covers the edge of display panel 23. By doing so, it can be difficult to understand the difference in appearance between display panel 23 and the other regions when wall surface 10 (FIG. 1) viewed from user 13 is viewed, that is, when the wall surface is viewed from the front side of surface member 11.

With the above-described configuration, it is possible to realize an information display device that does not make the user feel the position and the presence of the display panel.

Desirable performances for the display and touch panel used in this embodiment are the same as those described in the first embodiment.

Modification Example 4-1

Figure 20:
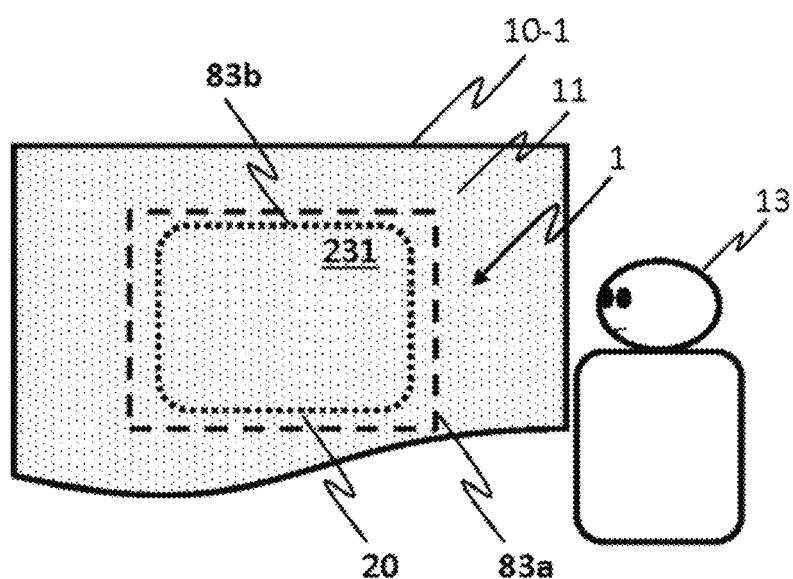
FIG. 20 illustrates an information display device according to a modification example of Embodiment 4.

As illustrated in FIG. 20, information display device 1D-1 (FIG. 19) according to Embodiment 4 may be configured such that the corners of inner edge 83b of mask layer 83 that surrounds display surface 231 of display panel 23 are formed in an arc shape. Alternatively or additionally, mask layer 83 may be colored by applying a gradation from outer edge 83a to inner edge 83b.

Accordingly, in a case of viewed from the front surface side of surface member 11, the difference in appearance between the part where display panel 23 is located and the other part can be made more difficult to understand.

In the modification example, when user 13 sees from surface member 11, the part where mask layer 83 is not installed is formed in a polygonal shape with rounded corners, or a circular or elliptical shape. Display panel 23 is usually rectangular, and its four corners are almost right angles. However, when the display surface is rectangular due to a difference in appearance when viewed from the front surface side of surface member 11, user 13 inevitably feels that there is a display on the rear surface. Here, the part where mask layer 83 is not installed is formed into a polygonal shape with rounded corners, or a circular or elliptical shape such that user 13 cannot see the rectangular shape on the display surface. Accordingly, user 13 does not recognize that display panel 23 is behind wall surface 10. Therefore, only the displayed information appears to emerge from wall surface 10, and user 13 can be given a fresh surprise.

Furthermore, mask layer 83 may be colored by applying a gradation from outer edge 83a illustrated in FIG. 20 to inner edge 83b. In this case, by gradually fading the color toward display surface 231, that is, inward, that is, by increasing the light transmittance, at the boundary part between mask layer 83 and display surface 231 of display panel 23, the difference in appearance between display surface 231 and the other parts when viewed from the front surface side of surface member 11 becomes more difficult to understand. Accordingly, it is possible to realize a configuration that does not make user 13 aware of the presence of display panel 23.

Modification Example 4-2

Figure 21:
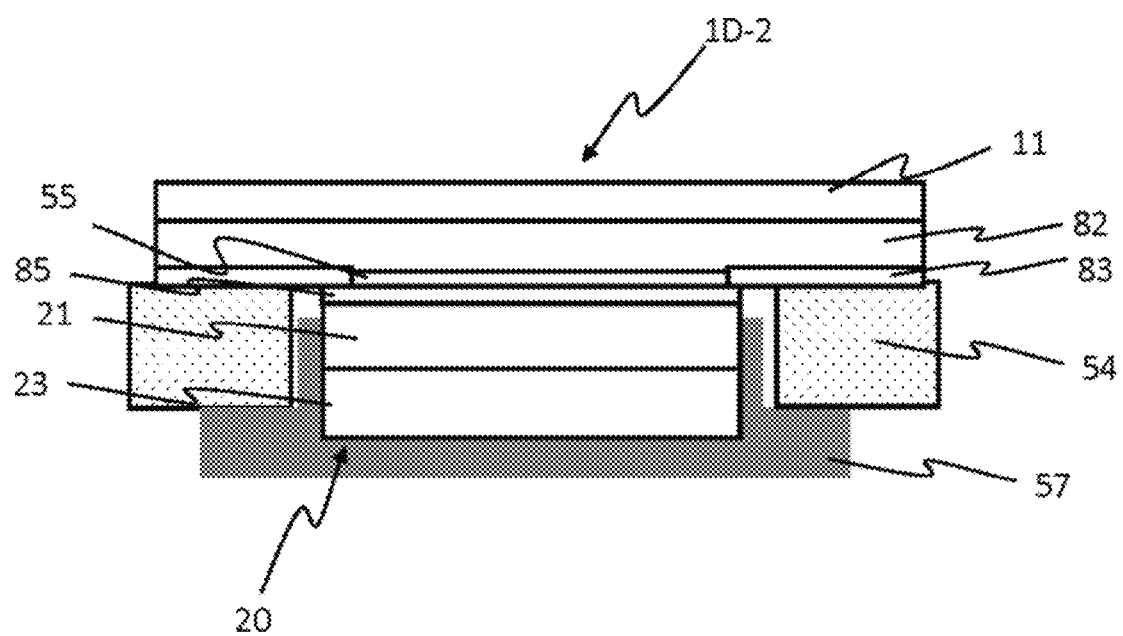
FIG. 21 is a schematic sectional view of an information display device according to another modification example of Embodiment 4.

FIG. 21 illustrates a modification example of information display device 1D attached by the structural body. FIG. 21 is a schematic sectional view of information display device 1D-2 according to the modification example. Information display device 1D-2 includes surface member 11, transparent member 82, mask layer 83, structural body 54, reflection layer (half mirror) 85, touch panel 21, display panel 23, and housing 57.

The thickness from surface member 11 to reflection layer 85 is preferably as thin as possible in order to minimize the blur of the display on surface member 11. The thickness is, for example, approximately 0.4 mm to 2.0 mm, preferably approximately 1.5 mm to 2.0 mm.

In order to make touch panel 21 operable, it is preferable that surface member 11, transparent member 82, and reflection layer 85 are formed by an insulator similar to Embodiment 1.

In a case where reflection layer 85 is disposed in a region that does not overlap structural body 54 as in the modification example, transparent surface member 11 has a different appearance when viewed from the front surface side by an object on the lower layer, that is, on the back side. Since information display device 1D-2 includes reflection layer 85, the information displayed on display panel 23 is displayed on surface member 11 while hiding the presence of display panel 23. However, the appearance when viewed from the front surface differs between the place where reflection layer 85 is located under surface member 11 and the other places. Here, in the modification example, by coloring mask layer 83, for example, white or gray, the appearance of wall surface 10 (FIG. 1) seen from user 13 and the appearance of display region 1a (FIG. 1) are prevented from becoming different from each other. The color of mask layer 83 is changed in accordance with the specifications of surface member 11, the luminance of the environment, the color of structural body 54, and the like. In a case of white or gray, an effect can be expected in which the color of a certain place of reflection layer 85 looks similar to other places.

5. Embodiment 5

Figure 22:
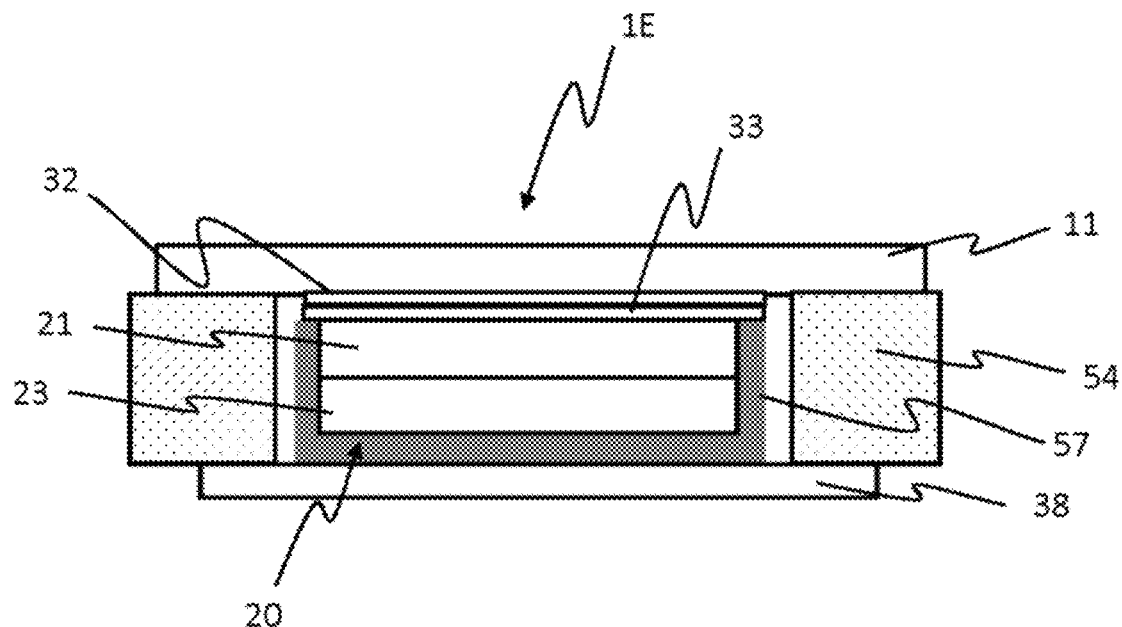
FIG. 22 is a schematic sectional view of an information display device according to Embodiment 5.

As illustrated in FIG. 22, in information display device 1E according to the embodiment, slight-adhesive layer 32 that can be peeled off again is disposed in front of display panel 23, and surface member 11 having a designability and light transmitting properties is disposed on the front side. Information display device 1E according to the embodiment reduces the blur on the display while realizing a seamless design having no seam between the wall surface and the information display region, and provides a comfortable operation feeling without an air gap in front of the touch panel.

Information display device 1E is used in any usage environment similar to the above-described embodiment. The description of information display device 1E having the same configuration and function as those of the above-described embodiments will be omitted, and the same reference numerals will be given to the same configuration members.

FIG. 22 is a schematic sectional view of information display device 1E of the embodiment. Information display device 1E includes surface member 11, slight-adhesive layer 32, reflection layer (half mirror) 33, touch panel 21, display panel 23, structural body 54, and housing 57. Information display device 1E is fixed to structural body 54 with housing 57, and structural body 54 is fixed to fixing member 38. Information display device 1E may not include reflection layer 33 and/or touch panel 21 in accordance with the function.

Slight-adhesive layer 32 is a member such as a film having the light transmitting properties and having a weak or slight adhesiveness on which both surfaces or one of the surfaces can be peeled off again. Slight-adhesive layer 32 prevents a gap (air gap) between the lower member (reflection layer 33 in the illustrated example, touch panel 21 in a case where reflection layer 33 is not provided, and display panel 23 in a case where touch panel 21 is not provided) and surface member 11. With the configuration, the information displayed on display panel 23 can be displayed on surface member 11 without the blur as much as possible. In particular, in a case where information display device 1E includes touch panel 21, the operation feeling of touch panel 21 deteriorates when the gap (air gap) is present. However, the presence of slight-adhesive layer 32 can improve the operation feeling of touch panel 21 and realize a user-friendly information display device.

Since slight-adhesive layer 32 can be peeled off again, when display device 20 breaks down, only display device 20 can be detached from the wall without breaking surface member 11, and accordingly, it is possible to make the maintenance easy. In the example of FIG. 22, display device 20 can be detached from surface member 11 with housing 57 by removing fixing member 38 disposed on the rear surface of housing 57. Accordingly, display device 20 can be replaced or repaired without breaking or damaging surface member 11.

The specific example here is merely an example, fixing member 38 may not be provided on the rear surface, a fixing arm may be projected from housing 57, and the arm may be fixed to structural body 54. In this case, there are various fixing members, such as a method in which there is an attaching screw on the side surface of housing 57, and after fixing housing 57 to structural body 54 with the attaching screw, structural body 54, housing 57, and display device 20 are collectively pressed against surface member 11 and fixed.

Slight-adhesive layer 32 may not have the light transmitting properties as long as the slight-adhesive layer has an area smaller than the area of the display surface of display panel 23 and a shape that avoids display contents. However, when the area is equal to or larger than the area of the display surface, the configuration that has the light transmitting properties and does not allow bubbles to enter is preferable. Accordingly, it is possible to prevent the information displayed on surface member 11 from blurring, and to realize an information display device which sharply displays information and is easily used by the user.

Furthermore, slight-adhesive layer 32 may be formed by imparting a slight adhesive to the surface of a lower layer member (reflection layer 33 in the illustrated example, and touch panel 21 in a case where there is no reflection layer 33). Otherwise, the slight adhesive may be imparted only to the front side of slight-adhesive layer 32, that is, only to surface member 11 side. However, as described above, by realizing a sheet on which a slight adhesive is imparted on both surfaces of the film having the light transmitting properties, in a case where there is damage or intrusion of dust due to peeling during the maintenance, it is possible to replace display device 20 only by replacing the sheet.

Reflection layer 33 is a material such as a half mirror, and reflects the external light, but transmits light from display panel 23 on the inside. By disposing reflection layer 33 between surface member 11 and display panel 23, the boundary between wall surface 10 and display region 1a can be made more difficult to understand as illustrated in FIG. 1. While the presence of display panel 23 itself is prevented from being seen through surface member 11 by the external light reflection characteristic of reflection layer 33, the display contents of display panel 23 can be presented to the user by the light transmission characteristic.

In addition, when surface member 11 has the sufficient external light reflection characteristic and the light transmission characteristics of the internal light source emitted from display panel 23, reflection layer 33 may be omitted.

Surface member 11, slight-adhesive layer 32, and reflection layer 33 are insulators such that touch panel 21 can operate, and preferably have a higher insulation resistance value.

Reflection layer 33 may be formed by a metal vapor-deposited film that can transmit electromagnetic waves or a film that can produce a metallic luster by laminating a resin material. In particular, an indium or tin-deposited film, a film formed by laminating a PET material, or the like is preferable. Accordingly, it becomes easy to ensure both the performance of touch panel 21 and to hide display panel 23.

Fixing member 38 is a sheet metal, a plastic component, or the like, and has a function of pressing display device 20 against surface member 11. Since slight-adhesive layer 32 or the weak-adhesive layer itself does not have a bonding force enough to fix display device 20 to surface member 11, the layers are used as a unit that further presses slight-adhesive layer 32 against surface member 11. Fixing member 38 may be a plate material such as a sheet metal or a plastic component. Further, the same effect can be obtained even when the arm is projected from housing 57 and fixed to structural body 54. Furthermore, a configuration in which display device 20 is pressed against surface member 11 by assembling with structural body 54 in a state of being attached to a fixed component (not illustrated) by a screw hole (not illustrated) provided on the side surface of housing 57, can also be realized.

In information display device 1E, the following effects can be obtained by disposing surface member 11, slight-adhesive layer 32, reflection layer 33, touch panel 21, and display panel 23 in this order. Since the place where reflection layer 33 is required is limited to the front of display panel 23, the cost can be reduced by placing reflection layer 33 only in the place where reflection layer 33 is required, and the range that can be repaired by maintenance can be expanded. However, in order to sufficiently exhibit the effect of making display panel 23 invisible from the outside and the effect of transmitting the contents displayed on display panel 23 and displaying the contents on surface member 11, which are the effects of reflection layer 33, it is preferable that reflection layer 33 is disposed at a position close to surface member 11. This is because, when there is a gap between reflection layer 33 and surface member 11, there is a possibility that the light transmitted through reflection layer 33 from display panel 23 is diffused and displayed on surface member 11 with blur. In other words, the position of reflection layer 33 and the position of slight-adhesive layer 32 may be in the order illustrated in FIG. 22 or in the order reverse thereto, depending on whether the priority is given to display quality requirements or cost or maintenance.

Furthermore, in information display device 1E, since slight-adhesive layer 32 can be peeled off again, surface member 11 and display device 20 can be separated from each other in terms of maintenance. Accordingly, maintenance work can be performed efficiently.

Desirable performances for the display and touch panel used in this embodiment are the same as those described in the first embodiment.

Modification Example 5-1

Figure 23:
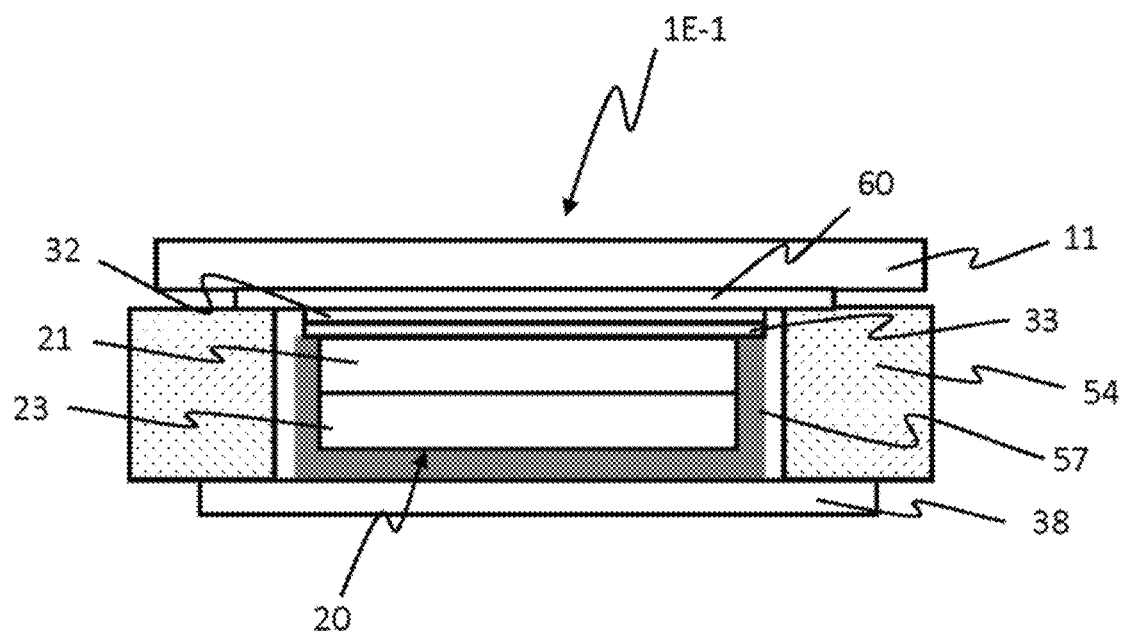
FIG. 23 is a schematic sectional view of an information display device according to a modification example of Embodiment 5.

As illustrated in FIG. 23, information display device 1E-1 according to the modification example is different from that of Embodiment 5 described above in that slight-adhesive layer 32 that can be peeled off again is adhered to front of display panel 23, and surface member 11 having a designability and light transmitting properties and base member 60 having light transmitting properties are integrated with each other on the front surface, that is, on the surface side. In information display device 1E-1, in addition to the effect similar to that of Embodiment 5 described above, surface member 11 cannot be damaged during the maintenance, and further, display device 20 can be attached regardless of the surface state of surface member 11.

In Embodiment 5 described above, in a case where surface member 11 is made of a brittle material such as cloth, for example, there is a case where surface member 11 is damaged even by the adhesive force of slight-adhesive layer 32, or there is a case where the adhesive effect of slight-adhesive layer 32 is not exhibited depending on the surface state where there is the unevenness on the rear surface of surface member 11 by the method of weak adhesion, such as the adhesion by static electricity. Therefore, by inserting base member 60 between surface member 11 and slight-adhesive layer 32, damage to surface member 11 by slight-adhesive layer 32 can be reduced, and the effect of slight-adhesive layer 32 can be maintained.

Base member 60 is a thin plate-like member having the light transmitting properties. Base member 60 may be fixed to surface member 11 by providing an adhesive layer (not illustrated) only on surface member 11 side so as to remain on structural body 54 side together with surface member 11 when display device 20 is detached. Otherwise, base member 60 may be fixed by being sandwiched between surface member 11 and structural body 54. Base member 60 has, for example, a smooth flat surface or a surface state that allows the bubbles to escape easily such that slight-adhesive layer 32 functions effectively.

Base member 60 is preferably as thin as possible in order to reduce the blur of the display on surface member 11, for example, approximately 0.4 mm to 2.0 mm, preferably 1.5 mm to 2.0 mm. In order to make touch panel 21 operable, it is preferable that surface member 11, slight-adhesive layer 32, and reflection layer 33 are formed by an insulator similar to Embodiment 5 described above. Further, for the same reason, it is preferable that base member 60 is also similarly an insulator and has a sheet resistance value of 30 megaohms or more.

Base member 60 may be formed by providing a region that performs mask printing and partially has no light transmitting properties, or by creating the base member with a material having no light transmitting properties and by partially providing a through-hole or a thinned part to allow light transmission. Accordingly, display region 1a (FIG. 1) can be limited without processing surface member 11, and leakage or transmission of extra light due to the backlight and the like of display panel 23 can be prevented. In this method, for example, by providing a gradation, it is also possible to make it difficult to understand the boundary between the place where the reflection layer is provided on the rear surface of surface member 11 and the place where the reflection layer is not provided. The function is performed as long as the size of base member 60 is larger than slight-adhesive layer 32, but from the above-describe viewpoint, it is preferable that base member 60 has a surface area at least equal to or larger than the display surface of display panel 23. Although base member 60 can be configured even on the entire surface of wall surface 10 (FIG. 1), the addition of an extra configuration leads to an increase in cost, and accordingly, it is preferable that the area of base member 60 slightly exceeds not the entire surface of the wall surface with design but the surface area of the display surface of display panel 23. Furthermore, in addition to the purpose of making display panel 23 invisible through surface member 11, display panel 23 can also add expression in a video displayed from display panel 23 for various applications by providing unevenness on the surface of base member 60 or providing optically refracted location.

The same effect as described above can be expected even when a mask layer is provided between touch panel 21 and the surface of display panel 23. However, since the layer is a part that changes depending on the usage environment and usage method of information display device 1E-1, it is considered that it is efficient to perform mask printing on base member 60 in consideration of not having to process surface member 11.

Information display device 1E-1 may not have to provide slight-adhesive layer 32 or reflection layer 33 by providing a reflective material or a slight adhesive on the front side of base member 60. Accordingly, the number of configuration members can be reduced, the distance between surface member 11 and display panel 23 can be reduced, and the display on display panel 23 can be expressed more sharply. However, it is preferable to separately provide slight-adhesive layer 32 and reflection layer 33 from the viewpoint of ease of repair when display device 20 is removed from surface member 11 for maintenance as described above.

In information display device 1E-1, the following effects can be obtained by disposing surface member 11, base member 60, slight-adhesive layer 32, reflection layer 33, touch panel 21, and display panel 23 in this order. Similar to Embodiment 5 described above, the position of reflection layer 33 may be between surface member 11 and base member 60 or between base member 60 and slight-adhesive layer 32, but it is preferable that the members and the like are disposed in the above-describe order from the viewpoint of ease of the maintenance.

In addition, information display device 1E-1 may not include reflection layer 33 or touch panel 21 for the same reason and condition as those in Embodiment 5 described above.

With the above-described configuration, information display device 1E and information display device 1E-1 according to Embodiment 5 and the modification examples thereof can be disposed without causing the user to feel the position and the presence of display panel 23 through surface member 11, and the information display with high designability can be realized. Furthermore, information display devices 1E and 1E-1 can be replaced by detaching only display device 20 without peeling off the entire wall surface 10 (FIG. 1) at the equipment failure. According to the configuration described in the embodiment, display device 20 can be detached from structural body 54 without damaging surface member 11, and display device 20 can be brought into close contact with surface member 11 regardless of the surface state or material of surface member 11. Further, a configuration in which the display region can be freely limited without processing surface member 11 or display panel 23 can be realized.

6. Embodiment 6

Figure 24:
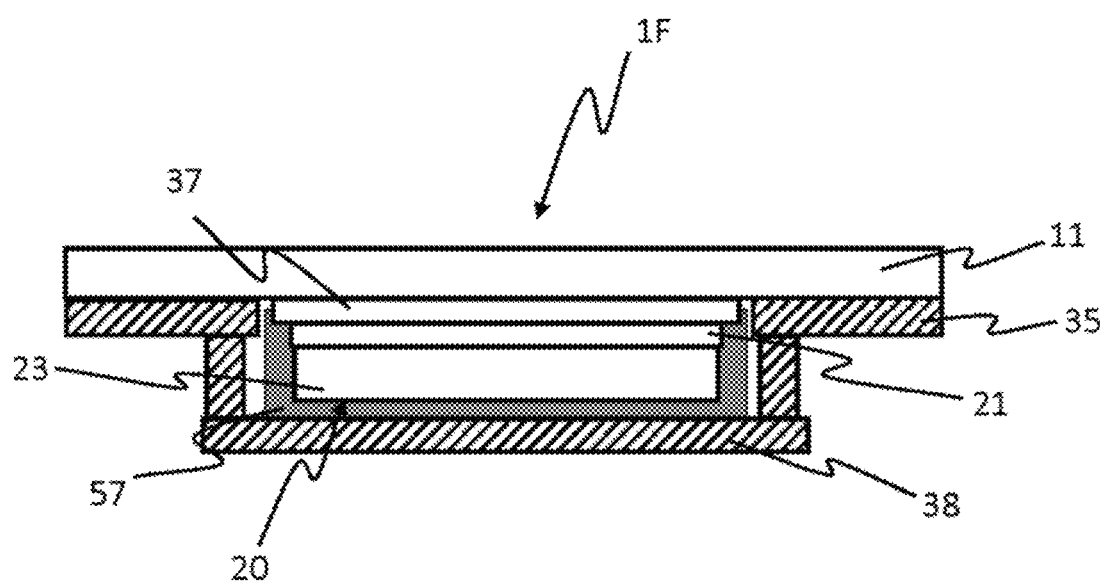
FIG. 24 is a schematic sectional view of an information display device according to Embodiment 6.

As illustrated in FIG. 24, information display device 1F according to the embodiment is different from those in the above-described embodiments in that compressible cushion sheet 37 is disposed between touch panel 21 and surface member 11. With the configuration, a void (air gap) hardly occurs between touch panel 21 and surface member 11, and touch panel 21 can be reliably operated.

Information display device 1F is used in any usage environment similar to the above-described embodiments. The description of information display device 1F having the same configuration and function as those of the above-described embodiments will be omitted, and the same reference numerals will be given to the same configuration members.

FIG. 24 is a schematic sectional view of information display device 1F of the embodiment. Information display device 1F includes surface member 11, cushion sheet 37, touch panel 21, display panel 23, and housing 57. Display panel 23 is disposed so as not to be seen through surface member 11. The components that configure information display device 1F do not necessarily need to be assembled integrally. The components may be disposed apart from each other or may be configured to be easily separated from each other. For example, cushion sheet 37 may be configured to be easily detachable from other components. Accordingly, in a case where cushion sheet 37 needs to be replaced due to aging or the like, an effect that maintenance becomes easy is achieved.

The structural body 35 is an aluminum plate or the like for reinforcing surface member 11. A case where surface member 11 has sufficient strength may not be necessary.

Cushion sheet 37 has the light transmitting properties, and is disposed between touch panel 21 and surface member 11 to be compressible. Since cushion sheet 37 is compressible, even in a case where surface member 11 has some unevenness, cushion sheet 37 can be disposed without forming a void between the front side of touch panel 21 and the back side of surface member 11. In general, it is known that the sensitivity of touch panel 21 is extremely reduced by the air entering between the member disposed on the surface and touch panel 21 in touch panel 21 of a capacitive sensing method or a resistive membrane method. In the embodiment, the sensitivity of touch panel 21 can be reliably maintained by not forming a void between touch panel 21 and surface member 11. In addition, cushion sheet 37 can prevent the video displayed on display panel 23 from being refracted due to the void and from being seen blur.

Cushion sheet 37 may be a member made of, for example, a gel material such as silicon, polyurethane, or urethane. Cushion sheet 37 may be plastically deformed by compression by an external force or may be elastically deformed by an external force. In particular, the positional relationship between surface member 11 and cushion sheet 37 may be displaced when display device 20 is subjected to some vibration or the position of fixing member 38 is displaced due to aging. Even in such a case, by using a material having elasticity as cushion sheet 37, a void is hardly generated between the configuration components. Further, cushion sheet 37 can be easily reused.

Display device 20 is fixed to the back surface side of surface member 11 by fixing member 38. In the embodiment, display device 20 is fixed by pressing housing 57 against surface member 11 side with fixing member 38. However, the fixing method is an example, and any fixing method may be used as long as display device 20 can be fixed to the back surface side of surface member 11.

Figure 25:
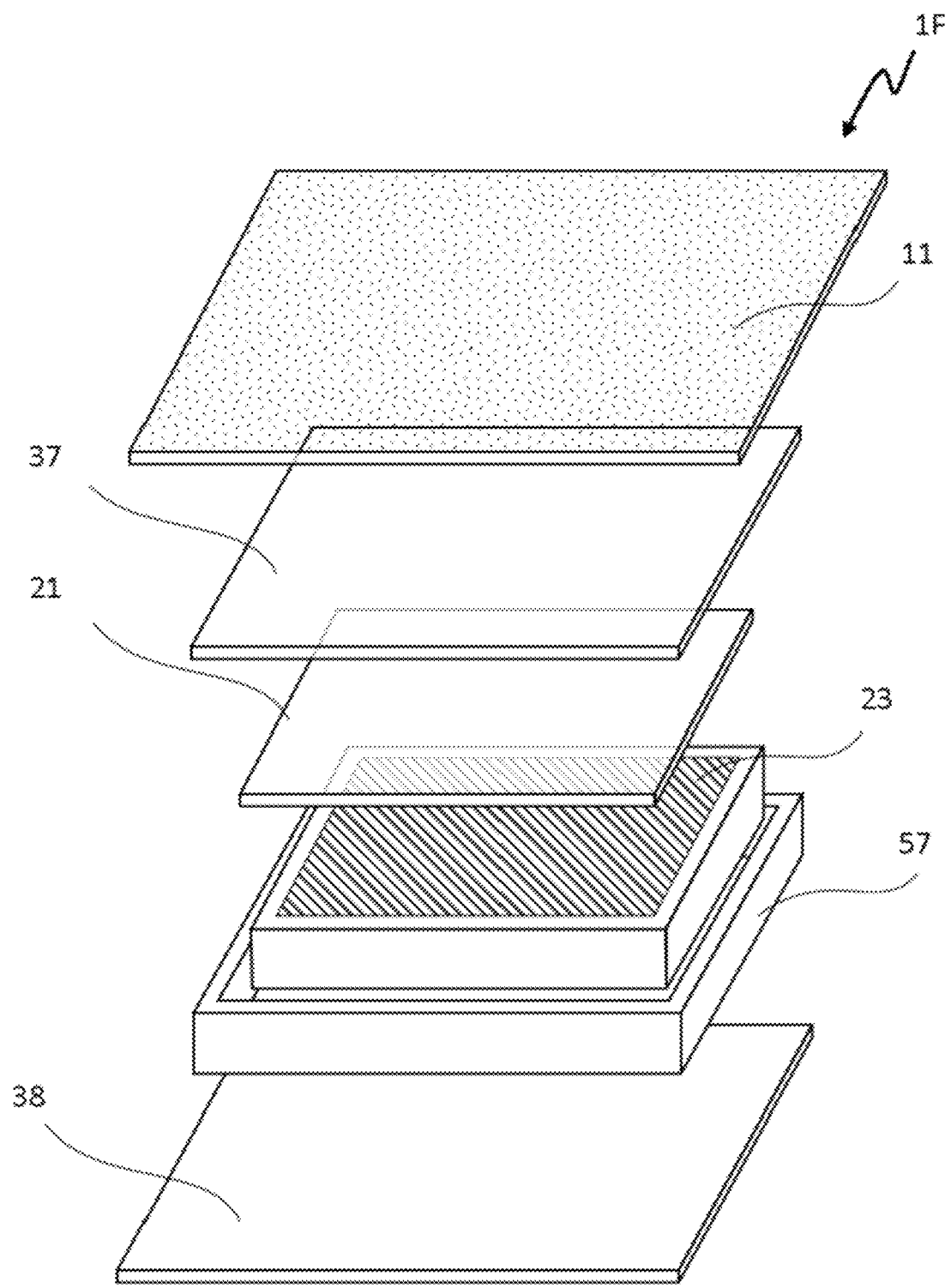
FIG. 25 is an exploded sectional view of the information display device according to Embodiment 6.

FIG. 25 is an exploded sectional view of information display device 1F according to the embodiment. As illustrated in the drawing, in the embodiment, cushion sheet 37 has a larger area than touch panel 21 and is disposed so as to cover the entire touch surface. By making the surface area of cushion sheet 37 larger than the display surface of display panel 23 or the operation region of touch panel 21, even in a case where there is a physical error in the position where cushion sheet 37 is pasted, the display surface of display panel 23 can be reliably operated. However, the configuration is not essential, and cushion sheet 37 may have the same area as that of touch panel 21 or may be disposed so as to cover a part of touch panel 21.

In information display device 1F, by disposing surface member 11, cushion sheet 37, touch panel 21, and display panel 23 in this order, a void between surface member 11 and touch panel 21 can be prevented, and the operation of touch panel 21 can be kept to be normal. In particular, there are a case where surface member 11 is a wall material and a case where there are some unevenness. In this case, a void is easily formed between surface member 11 and touch panel 21. However, due to the presence of cushion sheet 37, such a void can be effectively prevented, and the operability of touch panel 21 can be maintained.

Desirable performances for the display and touch panel used in this embodiment are the same as those described in the first embodiment.

Modification Example 6-1

Figure 26:
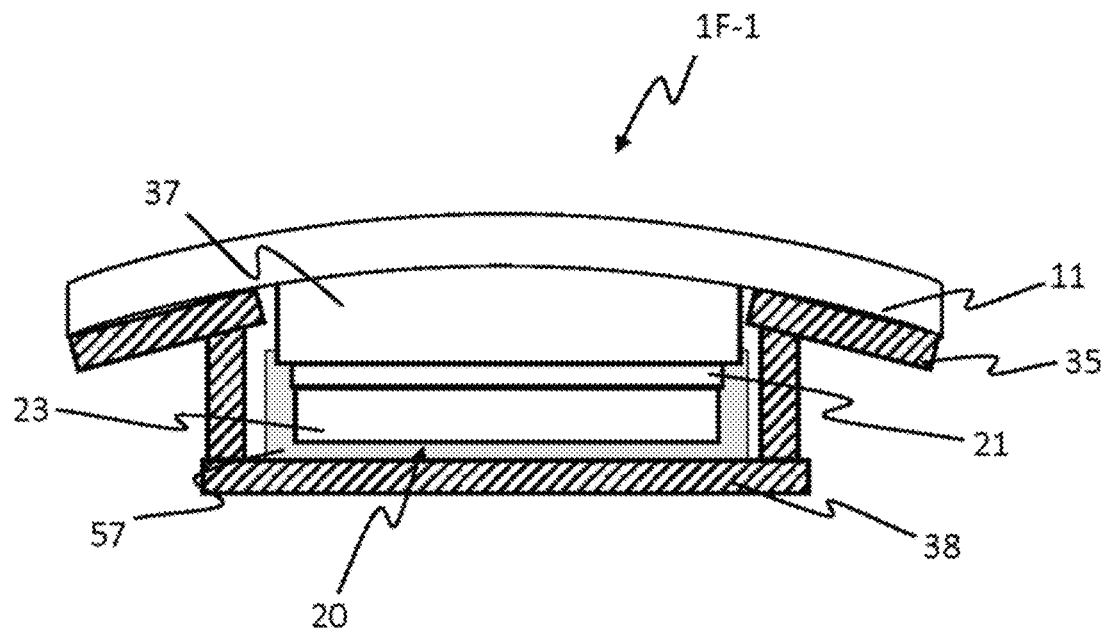
FIG. 26 is a schematic sectional view of an information display device according to a modification example of Embodiment 6.

FIG. 26 illustrates information display device 1F-1 according to a modification example. As illustrated in the drawing, in information display device 1F-1, even in a case where surface member 11 is configured not in a flat shape but in a curved shape, cushion sheet 37 having a sufficient thickness is disposed, and accordingly, following surface member 11, touch panel 21 can be reliably brought into an operable state.

Modification Example 6-2

Figure 27:
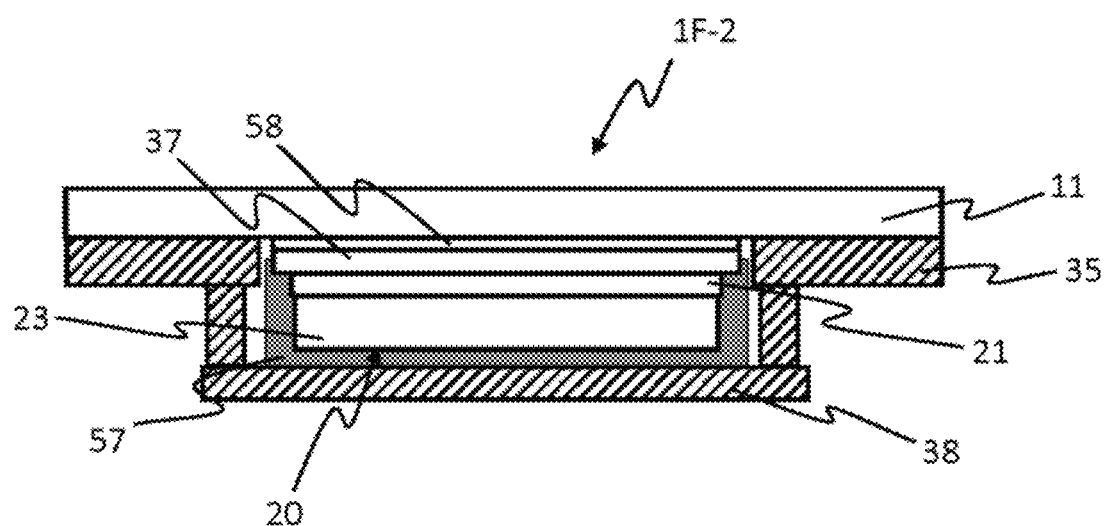
FIG. 27 is a schematic sectional view of an information display device according to another modification example of Embodiment 6.

FIG. 27 illustrates information display device 1F-2 according to another modification example. As illustrated in the drawing, in information display device 1F-2, by disposing film 58 having an adhesive layer between surface member 11 and cushion sheet 37, the generation of bubbles generated when cushion sheet 37 is in contact with surface member 11 is prevented. Accordingly, it is possible to prevent the generation of a void between touch panel 21 and surface member 11 and to make touch panel 21 more reliably operable. Furthermore, display device 20 can be easily separated from surface member 11.

FIG. 27 is a schematic sectional view of information display device 1F-2 according to the modification example. Information display device 1F-2 includes surface member 11, film 58, cushion sheet 37, touch panel 21, display panel 23, and housing 57. Display panel 23 is disposed so as not to be seen through surface member 11.

Information display device 1F-2 is different from those of the above-described embodiments in that non-adhesive film 58 is disposed between surface member 11 and cushion sheet 37. Film 58 is made of, for example, flame-retardant polycarbonate (PC), polyether terephthalate (PET) or fluoropolymer having a thickness of approximately 0.05 mm to 0.1 mm. When the thickness of the film is extremely thick, there is a possibility that the elasticity of the film becomes too strong and it is not possible to follow the unevenness of the front surface of surface member 11, and thus, a case where the thin film of the thickness is 0.05 mm or the like can expect more effect.

In non-adhesive film 58, the surface of non-adhesive film 58 may be processed by cutting or finely cutting the most surface of the film. Accordingly, the processed surface of film 58 becomes easier to follow the unevenness of surface member 11, and the generation of void therebetween can be prevented.

Embossing or Texture (extremely fine unevenness) may be provided on the back side (display panel 23 side) of surface member 11. Accordingly, the effect of eliminating the adhesiveness of the back surface of surface member 11 and suppressing the generation of bubbles between surface member 11 and cushion sheet 37 can be expected.

In information display device 1F-2, by disposing non-adhesive film 58 between surface member 11 and cushion sheet 37, when display device 20 including touch panel 21 breaks down, surface member 11 can be detached without breaking, only display device 20 can be easily detached from the wall surface, and accordingly, the maintenance work can become easy.

Instead of non-adhesive film 58, a non-adhesive material is applied or painted to the front side and/or back side of cushion sheet 37, or the front side and/or the back side of cushion sheet 37 are processed to have non-adhesiveness, and accordingly, a non-adhesive layer may be formed.

Otherwise, non-adhesive film 58 maybe slight-adhesive film or other slight adhesion layer.

Modification Example 6-3

Figure 28:
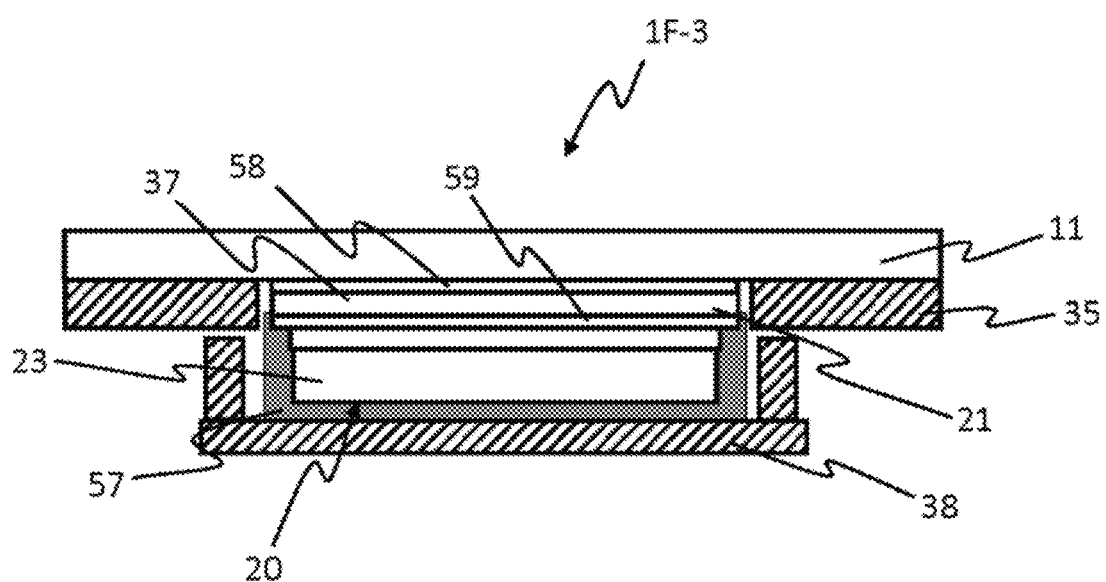
FIG. 28 is a schematic sectional view of an information display device according to another modification example of Embodiment 6.

FIG. 28 illustrates information display device 1F-3 according to another modification example. As illustrated in the drawing, information display device 1F-3 may include weakly adhesive film 59 on the back side (touch panel 21 side) of cushion sheet 37 in addition to the configuration illustrated in FIG. 29. With the configuration, cushion sheet 37 can be peeled off from touch panel 21 again. Accordingly, even when cushion sheet 37 becomes dirty, torn, or deformed, only cushion sheet 37 can be detached from information display device 1F-3 and replaced without breaking touch panel 21. Thereby, the maintenance work can become easy.

Otherwise, weakly adhesive film 59 may be a non-adhesive film or another non-adhesive layer. The configuration can also make the maintenance work easy.

7. Embodiment 7

Figure 29:
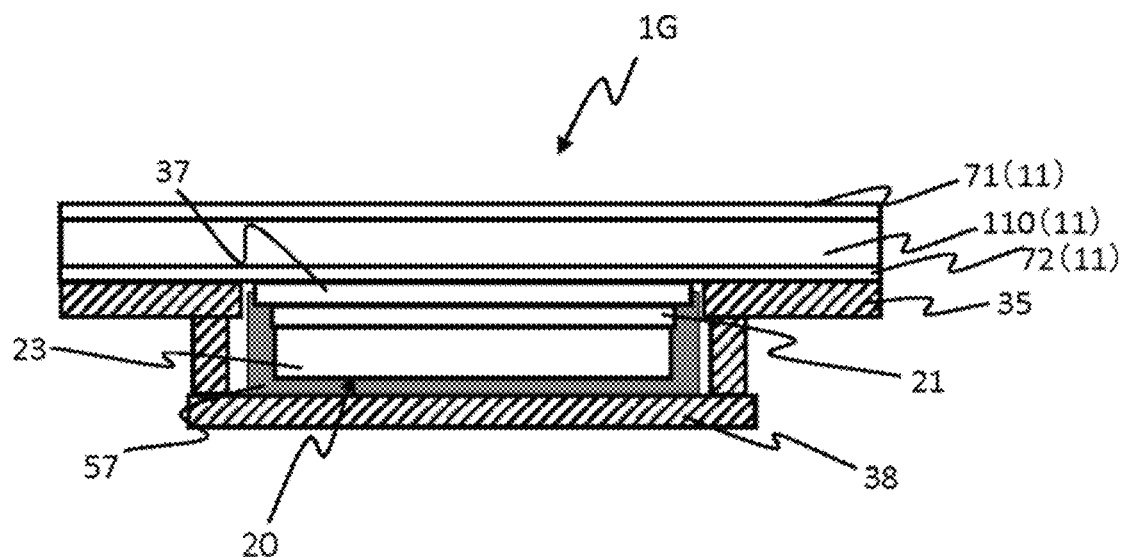
FIG. 29 is a schematic sectional view of an information display device according to Embodiment 7.

As illustrated in FIG. 29, information display device 1G according to the embodiment performs a decoration process such as painting or printing on the front side and the back side of surface member 11 having the light transmitting properties, and accordingly, the adjustment of the light transmittance is possible without being affected by the pattern of the front surface of surface member 11, and an information display device with excellent appearance can be realized.

Information display device 1G is used in any usage environment similar to the above-described embodiment. The description of information display device 1G having the same configuration and function as those of the above-described embodiments will be omitted, and the same reference numerals will be given to the same configuration members.

FIG. 29 is a schematic sectional view of information display device 1G of the embodiment. Information display device 1G includes surface member 11, cushion sheet 37, touch panel 21, display panel 23, and housing 57. An effect that the replacement during the maintenance becomes easy as cushion sheet 37 can be peeled off from display device 20. However the function as the information display device 1G can be satisfied without cushion sheet 37.

Display device 20 is fixed to the back surface side of surface member 11 by fixing member 38. In the embodiment, display device 20 is fixed by fixing housing 57 to the structural body 35 and pressing housing 57 against surface member 11 side with fixing member 38. However, the fixing method is an example, and any fixing method may be used as long as display device 20 can be fixed to the back surface side of surface member 11.

Figure 47:
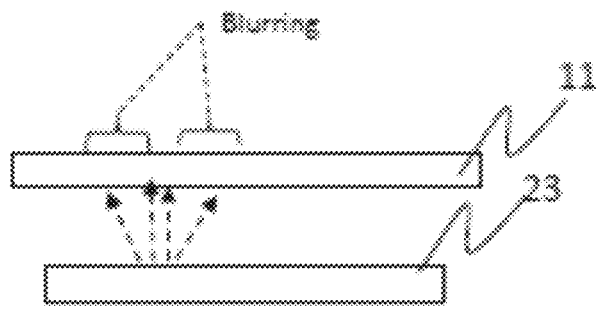
FIG. 47 is a schematic sectional view of an information display device according to a comparison example, in relation to an example of Embodiment 7.
Figure 48:
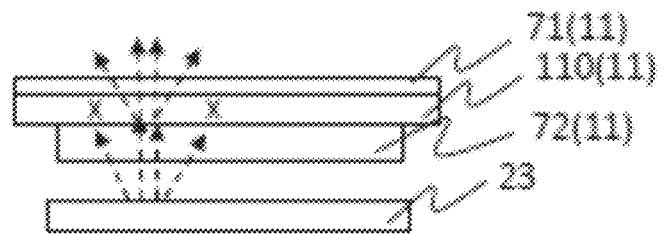
FIG. 48 is a schematic sectional view of an information display device according to the example of Embodiment 7.

Surface member 11 includes first layer 71 subjected to the decoration process, plate-like member 110, and second layer 72 for adjusting the light transmittance. First layer 71 and second layer 72 are formed by decorating the front side and the back side of plate-like member 110 by painting or printing. For example, in the usage environment illustrated in FIG. 1, first layer 71, which is the front surface side directly seen from user 13, is decorated more precisely, such as printing or painting, which imitates a real material. However, when such decoration is performed, it becomes difficult to control the light transmittance and displayed information on surface member 11 may blurred. Therefore, the side which is not directly visible from user 13, that is, the back side of surface member 11 is also decorated by painting or printing. By providing the decorated layers on both surfaces in this manner, the blur and the light transmittance passing through surface member 11 and decorated first layer 71 and second layer can be controlled with a high degree of freedom. For example, in a case where a light-colored wood pattern is printed on first layer 71 on the front surface side of surface member 11, the amount of light transmitted from the front surface side of the first layer to display device 20 side increases, and there is a possibility that the shape of display panel 23 is seen from the user. Here, by painting second layer 72 on the back side of surface member 11 with a relatively dark color ink, the amount of transmitted light can be adjusted to prevent display panel 23 from being seen through surface member 11. Further, since surface member 11 is a transparent or translucent material, by decorating both surfaces of surface member 11, the decorative expression seen from the front surface side can be deepened, and the authenticity can be further enhanced. On the other hand, when there is a distance between the surface member 11 and the display 23 as shown in FIG. 47, the information displayed on the surface of the surface member 11 is blurred. Therefore, an optical filter having a characteristic of transmitting light rays of high luminance and blocking light rays of low luminance is provided as the second layer 72. As a result, as shown in FIG. 48, only light in the vertical direction with respect to the display 2 having relatively high brightness reaches the surface member 11, and light emitted in other directions does not reach the surface member 11. Thereby, the blurring of the information displayed on the surface member 11 can be suppressed.

First layer 71 and/or second layer 72 may be made of a film.

Second layer 72 having a light transmittance adjusting function may be formed by vapor deposition. Otherwise, the second layer may be formed by translucent solid printing. In this case, the printing may be performed by performing painting with black with a light transmittance of 40% to 60%.

First layer 71 is disposed to be in close contact with a part or the entirety of the front side of plate-like member 110, and second layer 72 is disposed to be in close contact with a part or the entirety of the back side of plate-like member 110.

The light transmittance of second layer 72 is preferably 40% to 60%. Otherwise, second layer 72 may be formed by a half mirror having a light transmittance of 40% to 70%. Alternatively, second layer 72 may be formed by an optical filter. In this case, for example, the optical filter is designed to transmit only light from display panel 23 and prevent transmission of external light. Alternatively, it is preferable that the optical filter has a characteristic of transmitting only the light having a luminance of 500 cd/m^2 or more among the light arriving from the display panel 23 and blocking the light having a luminance less than that.

The combined light transmittance of first layer 71 and second layer 72 is preferably 8% to 15%.

The same effect can be realized even if the second layer 72 is disposed on the surface of the touch panel 37 (specifically, the surface of the cover glass of the touch panel) instead of the surface of the plate-like member 110. When the second layer 72 is installed on the touch panel side, the plate-like member 110 needs only the first layer 71 to decorate the surface, and the surface treatment applied to the plate-like member 110 can be reduced. The choice of materials used for the layer 71 can be expanded. Display panel 23 is preferably adjusted by CPU 22 (FIG. 1) such that the luminance on surface member 11 due to the light transmitted through surface member 11 is 200 cd/m^2 or less. Preferably, display panel 23 is adjusted by CPU 22 (FIG. 1) such that the luminance of the light source (not illustrated) at the time of being turned on is 800 cd/m^2 or more.

With the above-described configuration, information display device 1G adjusts the amount of light transmission of surface member 11 to prevent display panel 23 from being seen through surface member 11, and to make the information displayed on surface member 11 comfortably seen from the user.

Desirable performances for the display and touch panel used in this embodiment are the same as those described in the first embodiment.

Modification Example 7-1

Figure 30:
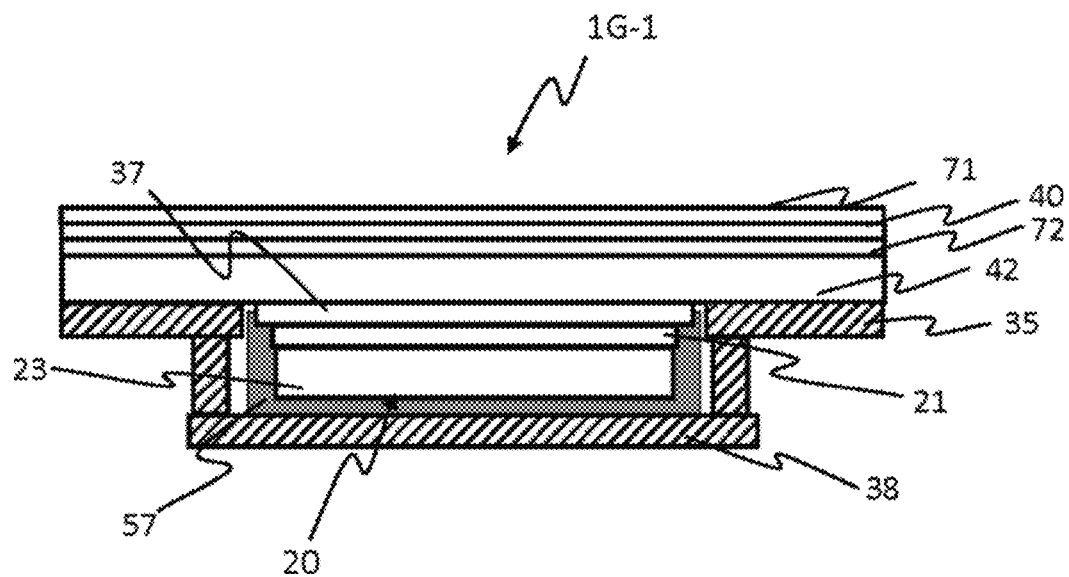
FIG. 30 is a schematic sectional view of an information display device according to a modification example of Embodiment 7.

FIG. 30 illustrates information display device 1G-1 according to a modification example. In the example illustrated in FIG. 29, the decorative layers are provided on the front side and the back side of surface member 11, but the method of realizing surface member 11 is not limited thereto. For example, the surface member is formed by decorative film 40 having the light transmitting properties disposed on the surface of a transparent plate having a sufficient rigidity, and the same effect can be obtained by performing the decoration process with respect to the both surfaces of decorative film 40.

FIG. 30 is a schematic sectional view of information display device 1G-1. Information display device 1G-1 includes decorative film 40 that is a transparent or translucent film member, light-transmitting plate 42 that is a plate-like member, cushion sheet 37, touch panel 21, display panel 23, and housing 57. Surface member 11 includes light-transmitting plate 42 for maintaining rigidity and decorative film 40 for realizing surface decoration. Decorative film 40 includes first layer 71 and second layer 72. The decoration process is performed on the front side of decorative film 40 to form first layer 71, and the decoration process is performed on the back side of decorative film 40 to form second layer 72.

First layer 71 is disposed to be in close contact with a part or the entirety of the front side of decorative film 40. Second layer 72 is disposed to be in close contact with a part or the entirety of the back side of decorative film 40. Decorative film 40 may be pasted to light-transmitting plate 42 with an adhesive.

With the above-described configuration, information display device 1G-1 can control the light transmittance and express the depth to the decorative expression, similar to the example illustrated in FIG. 25.

8. Embodiment 8

Figure 31:
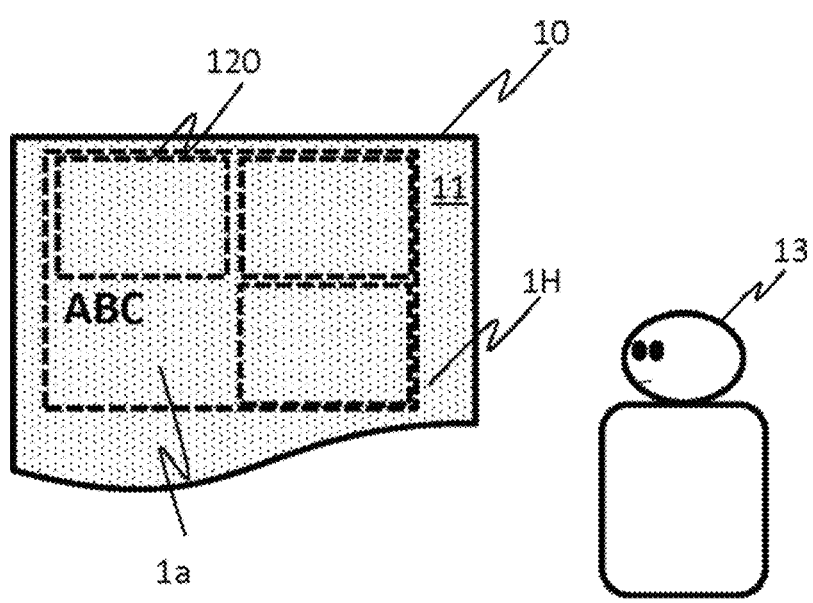
FIG. 31 illustrates a usage environment of an information display device according to Embodiment 8.

FIG. 31 illustrates a usage environment of information display device 1H according to the embodiment.

In the usage environment in the embodiment, information display device 1H is disposed on wall surface 10 in an aircraft or the like. Information display device 1H displays information displayed on the display panel to be seen on display region 1a by transmitting the light of the display panel from the back side of surface member 11.

Information display device 1H is used in any usage environment similar to the above-described embodiment. The description of information display device 1H having the same configuration and function as those of the above-described embodiments will be omitted, and the same reference numerals will be given to the same configuration members.

Information display device 1H according to the embodiment is different from those in the above-described embodiments mainly in that reflectance variable reflection layer (half mirror layer) 120 capable of partially changing the light transmittance and the reflectance is provided. Normally, by adding a reflection layer between surface member 11 and display panel 23 of the information display device, appearance of transparency on the surface decoration layer of surface member 11 can be reduced, and the images on display region 1a can also be colored with an appropriate color. However, the reflection layer also reduces the light from the light source (display panel 23 or another light source) inside display device 20. For example, when the reflectance of the reflection layer is 50%, the light transmittance is also 50%. Therefore, the light from display panel 23 to be displayed becomes darker, and the place not to be displayed becomes bright and prominent. For example, in a case where a liquid crystal display is used, there is a case where the light of the backlight is visible even on a dark screen.

In the embodiment, a reflection layer of which the light transmittance or the reflectance can be partially changed is provided. In the reflection layer, the light transmittance of only the location desired to be displayed from display panel 23 is increased, the light transmittance of the other locations (the locations where information is not displayed) is reduced to increase the reflectance, and accordingly, an information display device of which the real feeling of the decorative layer on surface member 11 is improved can be realized.

In addition, by increasing the light transmittance and lowering the reflectance for a certain region of the display, there is a case where the color of the background is different from the intended color of the surface decoration layer, and the color of the background is picked up and darkened, but at this time, display panel 23 emits light that corrects the amount of darkness caused by the increase in the transparency of the reflection layer with respect to the surface decoration layer, and accordingly, the unnaturalness can be eliminated.

Although display region 1a in which the light transmittance can be changed is expressed by a square in FIG. 31, the shape, the number, and the size of display region 1a are not limited.

Figure 32:
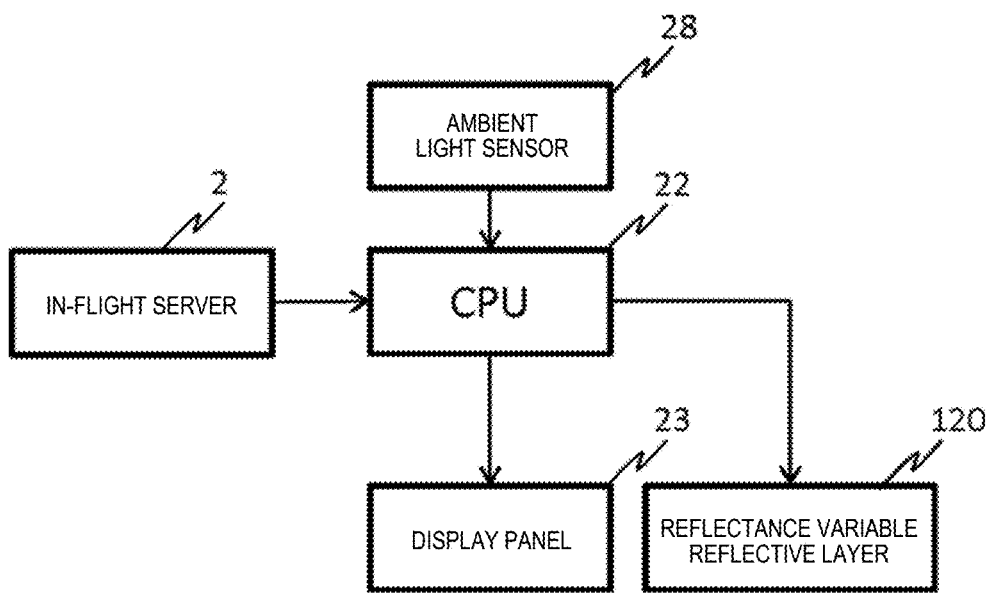
FIG. 32 is a configuration view of a system for operating the information display device according to Embodiment 8.

FIG. 32 is a configuration view of a system for operating information display device 1H according to the embodiment. CPU 22 causes display panel 23 to display necessary or useful information for user 13 based on the information from in-flight server 2. CPU determines a region where the reflectance or the light transmittance of reflectance variable reflection layer 120 is changed based on the information to be displayed on display panel 23 and the ambient light information from ambient light sensor 28, which are acquired from in-flight server 2. CPU 22 also calculates the reflectance and/or the light transmittance based on the ambient light information from ambient light sensor 28, and changes the reflectance or the light transmittance of reflectance variable reflection layer 120. In addition, in a case where ambient conditions can be grasped without measuring, or in a case where ambient light conditions may not be considered, an ambient light sensor may not be provided. In this case, CPU 22 controls reflectance variable reflection layer 120 based on predetermined reference information (for example, the luminance of display panel 23).

Figure 33:
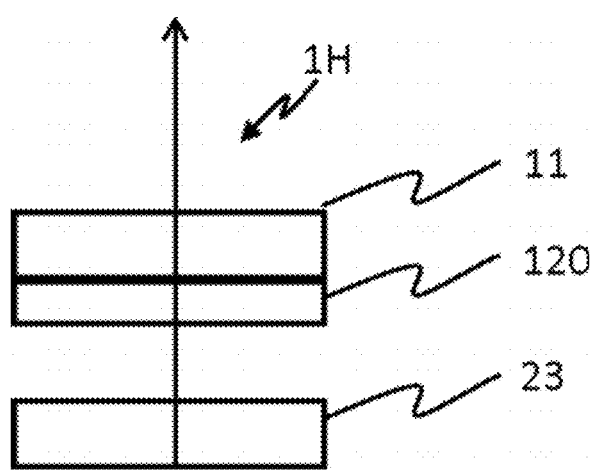
FIG. 33 is a schematic sectional view of the information display device according to Embodiment 8.

FIG. 33 is a schematic sectional view of information display device 1H of the embodiment. Information display device 1H includes surface member 11, reflectance variable reflection layer (half mirror) 120, and display panel 23. Light from display panel 23 is transmitted through reflectance variable reflection layer 120 and displays information on display region 1a of surface member 11.

Information display device 1H according to the embodiment can enhance the effect of decoration such as a real feeling other than the location on surface member 11 where information is displayed, and can improve the light transmittance of the location where information is displayed on display panel 23.

Desirable performances for the display and touch panel used in this embodiment are the same as those described in the first embodiment.

9. Embodiment 9

Figure 34:
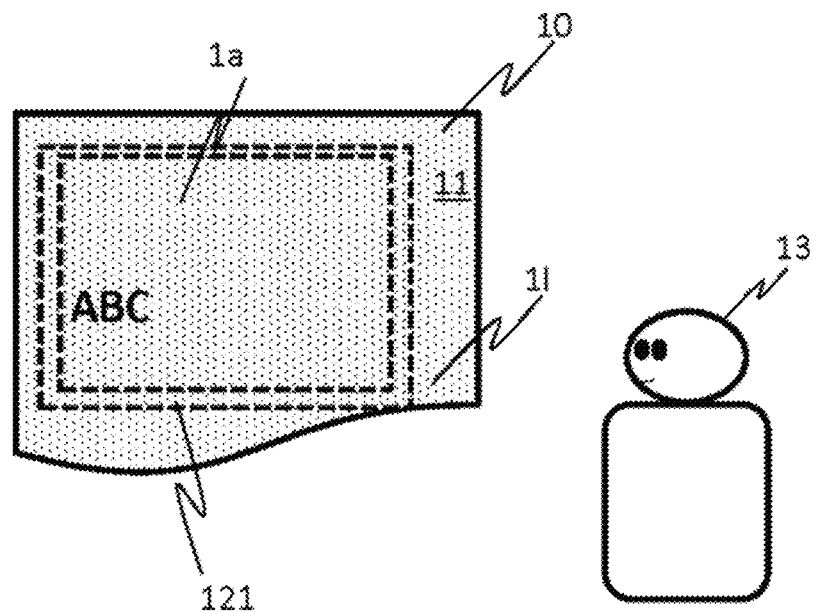
FIG. 34 illustrates a usage environment of an information display device according to Embodiment 9.

FIG. 34 illustrates a usage environment of information display device 1I according to the embodiment.

In the usage environment in the embodiment, information display device 1I is disposed on wall surface 10 in an aircraft or the like. Information display device 1 performs display such that user 13 can see the display in display region 1a by transmitting the light of the display panel from the back side of surface member 11.

Information display device 1I is used in any usage environment similar to the above-described embodiment. The description of information display device 1I having the same configuration and function as those of the above-described embodiments will be omitted, and the same reference numerals will be given to the same configuration members.

Information display device 1I is different from those of the above-described embodiment in that reflection layer (half mirror layer) 121 that can selectively transmit the light from display panel 23 is provided. With such a configuration, the light from display panel 23 can be selectively transmitted. Reflection layer 121 transmits only light desired to be displayed from display panel 23, does not transmit other light, and accordingly, it is possible to prevent unnecessary display and light leakage, and to enhance the real feeling of the surface decoration layer of surface member 11.

Figure 35:
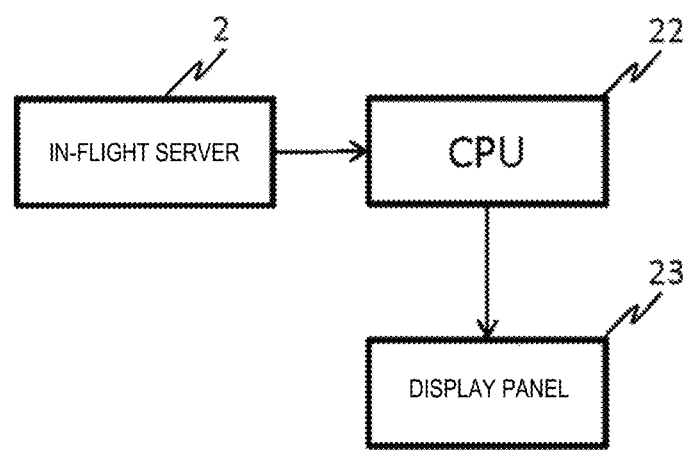
FIG. 35 is a configuration view of a system for operating the information display device according to Embodiment 9.

FIG. 35 is a configuration view of a system for operating information display device 1I according to the embodiment. CPU 22 calculates the wavelength of light that is easily transmitted through reflection layer 121 based on information from in-flight server 2, and causes display panel 23 to display the light. Reflection layer 121 that can selectively transmit the light may have a role of a filter that converts the wavelength of the light and transmits the light. By doing so, it is considered that the expression of colors with better color development becomes possible.

Figure 36:
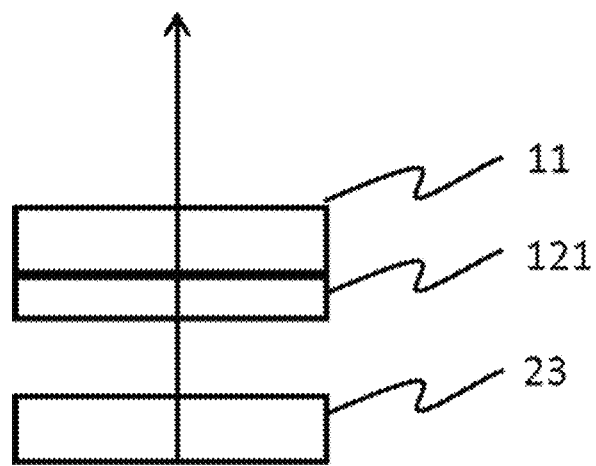
FIG. 36 is a schematic sectional view of the information display device according to Embodiment 9.

FIG. 36 is a schematic sectional view of information display device 1I of the embodiment. Information display device 1I includes surface member 11, reflection layer (half mirror) 121 for selectively transmitting light, and display panel 23, the light from display panel 23 is transmitted through reflection layer 121, and the information is presented to the user through display region 1a on surface member 11.

With the above-described configuration and operation, information display device 1I of the embodiment has an effect of reducing elements that deteriorate the real feeling at locations other than the locations where information is displayed by the light of the backlight of display panel 23 or the like. Furthermore, a location to be displayed on display panel 23 can be clearly displayed.

Desirable performances for the display and touch panel used in this embodiment are the same as those described in the first embodiment.

10. Embodiment 10

Figure 37:
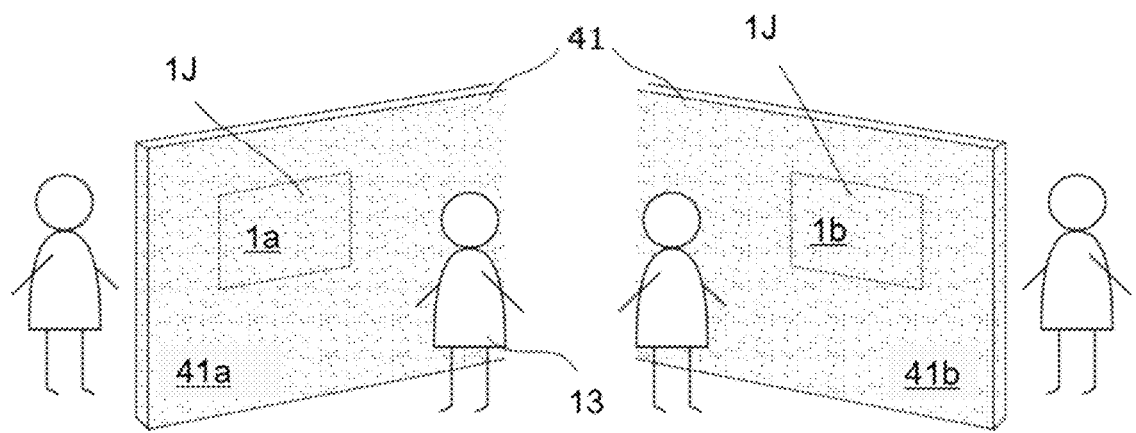
FIG. 37 illustrates a usage environment of an information display device according to Embodiment 10.

FIG. 37 illustrates a usage environment of information display device 1J according to the embodiment.

In the usage environment in the embodiment, information display device 1J is disposed on partition 41 which is a part of the interior of the aircraft. Partition 41 partitions a space in the aircraft, such as a wall that separates the personal space of passengers from a passage where crews walk, and a wall of a shell seat. Partition 41 has surface 41a and surface 41b opposite to surface 41a. Information display device 1J according to the embodiment is different from those of the above-described embodiments mainly in that information display device 1J is disposed so as to provide display regions 1a and 1b on both surfaces of partition 41.

Information display device 1J is used in any usage environment similar to those of the above-described embodiments as long as information display device 1J is a plate-like structure such as partition 41 and has a structure that is open on both sides. For example, the structure is disposed on a wall, a door of a container, or a seat disposed in an aircraft, that is, at a position visible from a passenger or a crew of the moving object. As illustrated in the example illustrated in FIG. 9, information display device 1J may be disposed on wall surface 94 of the cabin wall of the seat compartment, the information mainly toward crew 93 such as a cabin crew may be displayed on the display surface on the passage side of the wall surface 94, and the information toward the passenger may be displayed on the display surface on the seat side opposite to the wall surface 94. The description of information display device 1J having the same configuration and function as those of the above-described embodiments will be omitted, and the same reference numerals will be given to the same configuration members.

Figure 38:
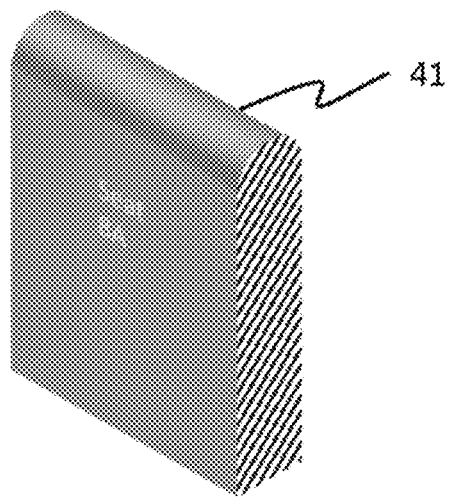
FIG. 38 illustrates an appearance of the information display device according to Embodiment 10.

As illustrated in FIG. 38, information display device 1J is installed in partition 41 of which the upper part is curved. As illustrated in the exploded perspective view of FIG. 39, structural body 410 that serves as the basis of partition 41 is a plate-like structure having a curved upper part, recess 410a is formed by depressing a part of the upper part, and plate-like body 43 is formed on recess 410a. Display panel 23 is attached to be over plate-like body 43 in recess 410a. Surface member 11 is attached so as to cover display panel 23 and structural body 410.

Figure 40:
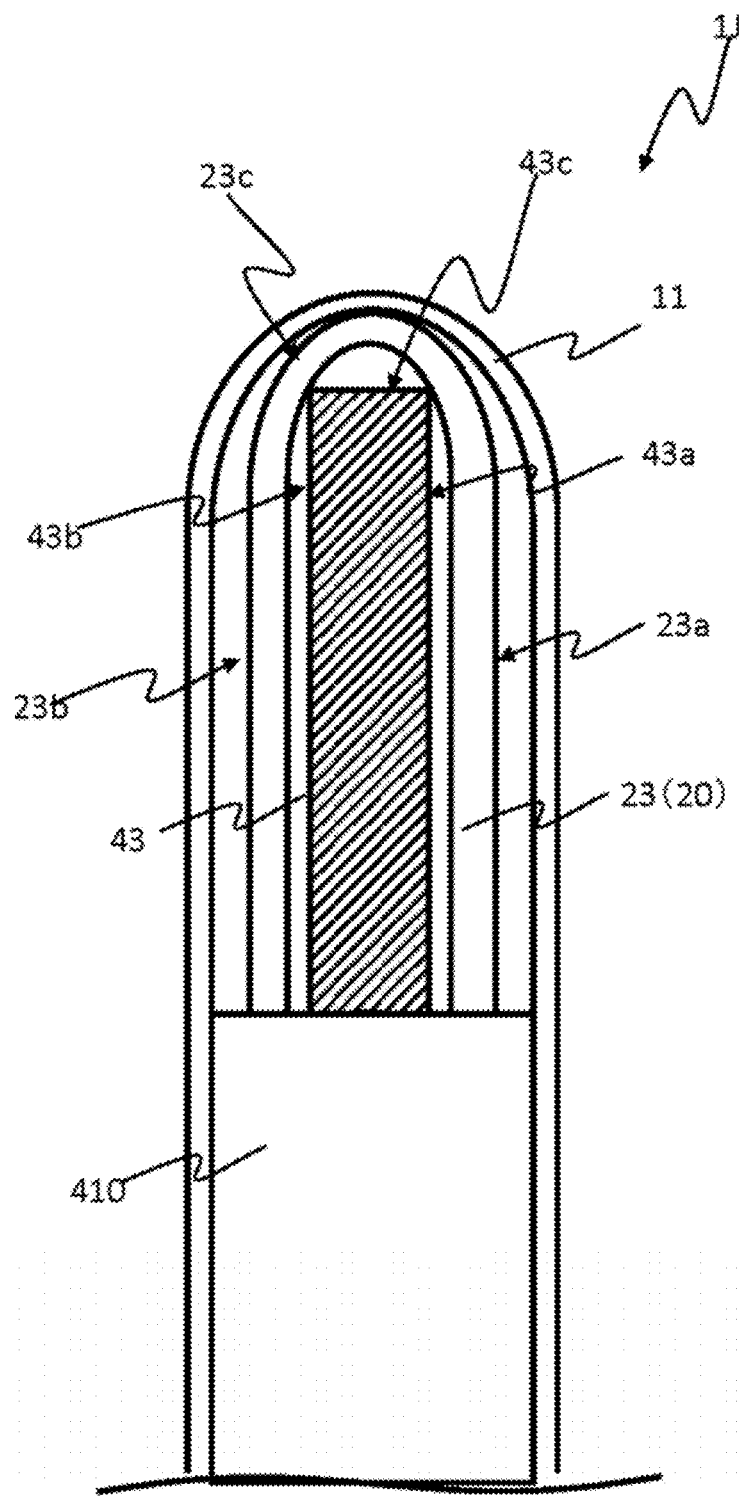
FIG. 40 is a schematic sectional view of the information display device according to Embodiment 10.

FIG. 40 is a schematic sectional view of information display device 1J. Information display device 1J includes plate-like body 43 which is a part of structural body 410, display panel 23, and surface member 11. Plate-like body 43 has first attaching surface 43a, second attaching surface 43b opposite to first attaching surface 43a, and side portion 43c that connects first attaching surface 43a and second attaching surface 43b to each other.

Display panel 23 is, for example, an OLED (Organic Light Emitting Diode) display or the like, and is a flexible display device that can be bent. Display panel 23 has first display surface 23a via curved portion 23c, and second display surface 23b opposite to first display surface 23a. Display panel 23 is attached onto plate-like body 43 such that first display surface 23a covers first attaching surface 43a, second display surface 23b covers second attaching surface 43b, and curved portion 23c covers side portion 43c. Display panel 23 can display different information on first display surface 23a and second display surface 23b.

Display panel 23 disposed on plate-like body 43 in recess 410a may have a thickness that does not protrude to the outside of recess 410a, that is, does not protrude from the outer surface of the other parts of structural body 410. In other words, the vertical and horizontal length and thickness of display panel 23 are configured to substantially match the vertical and horizontal length and depth of recess 410a. Accordingly, the surface of structural body 410 other than the part where recess 410a is formed can be substantially flush with the display surface of display panel 23.

Surface member 11 has a surface area larger than that of display panel 23, and is pasted so as to cover recess 410a to which display panel 23 is attached and the other parts of structural body 410.

Information display device 1J according to the embodiment has high designability by realizing information display in a seamless region having no boundary with a wall surface, and additionally, can perform various information presentations efficiently by disposing the display regions on both sides of the wall. Furthermore, since the information is displayed on both sides of the wall with one information display device, the number of components and the complexity of wiring can be reduced.

Figure 39:
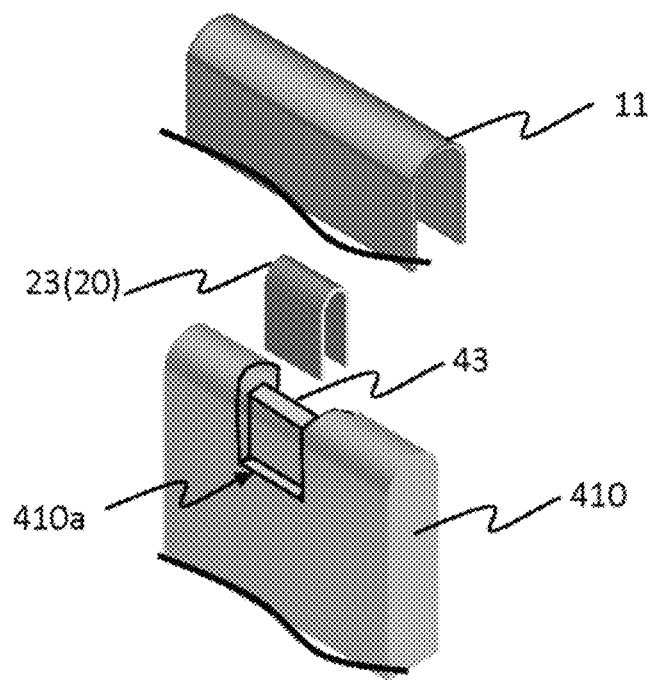
FIG. 39 is an exploded sectional view of the information display device according to Embodiment 10.

In the above embodiment, as shown in FIGS. 39 and 40, the upper portion of the side portion 43c of the plate-like body 43 has an approximately right-angled shape. Instead of this right-angled shape, it may be the curved shape along with the curved portion 23c of the display panel 23 (or it may be a rounded shape on the corners). Thereby, the load generated when the display panel 23 is attached can be reduced.

Modification Example 10-1

Between display panel 23 and surface member 11, a transparent or translucent member (not illustrated) disposed to cover the display surface of display panel 23 may be disposed.

The transparent or translucent member is, for example, a laminated film. The laminated film has such characteristics that, while having the light transmitting properties, the presence of the internal configuration (display panel 23 or recess 410a) on the back side of surface member 11 is not visible when viewed from the line of sight of user 13 (FIG. 37). The laminated film is pasted with an adhesive or the like so as to cover structural body 410 and display panel 23 before surface member 11 is disposed. With the configuration, light emitted from display panel 23 can be projected on surface member 11 through the laminated film. Accordingly, when the information is not displayed, only the information displayed in a region that is not different from the surrounding wall surface can be made to emerge, and accordingly, extremely high designability can be realized.

Since the outer surface of the other parts of structural body 410 other than recess 410a and the display surface of display panel 23 are substantially flat, the operation of pasting the laminated film becomes easy. Accordingly, the steps required for manufacturing information display device 1J become simple. Further, the laminated film is sufficient when the film has a certain degree of light transmitting properties and does not require any special characteristics, and thus, a film generally used as a building material can be used. For example, even in an environment with strict fire prevention standards such as in an aircraft, wallpaper that has already been used in such an environment can often be used as it is.

The transparent or translucent member may be provided only on display panel 23 in recess 410a. In this case, the transparent or translucent member is attached such that the front surface is flush with, or at least protrudes from, the outer surface of the other parts of structural body 410 other than recess 410a. In other words, the depth of recess 410a is a size obtained by adding the thickness of display panel 23 and the thickness of the transparent or translucent member.

Modification Example 10-2

Figure 41:
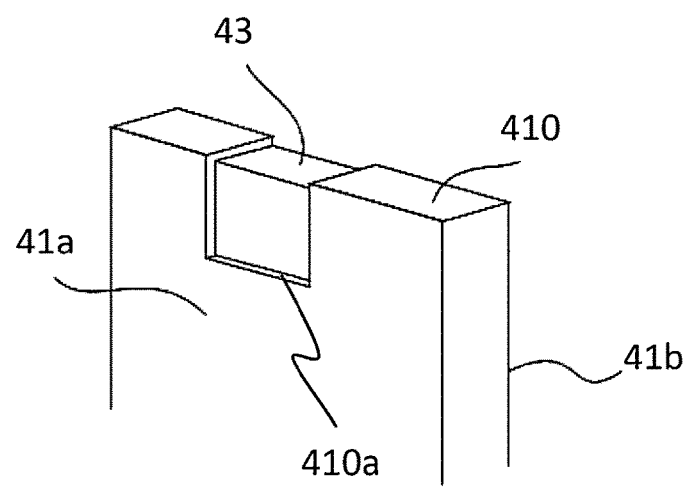
FIG. 41 is a perspective view of a structure before an information display device according to a modification example of Embodiment 10 is attached.
Figure 42:
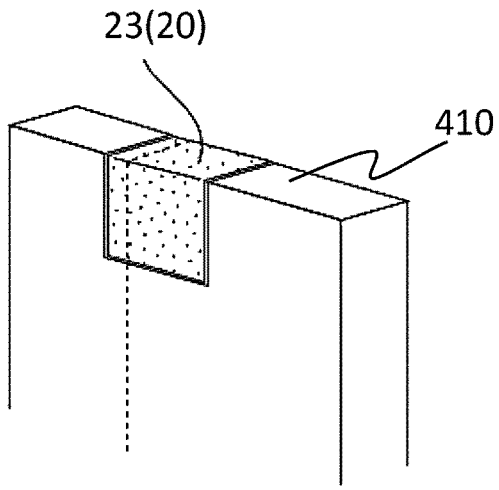
FIG. 42 is a perspective view of a structure in the middle of attaching the information display device according to the modification example.
Figure 43:
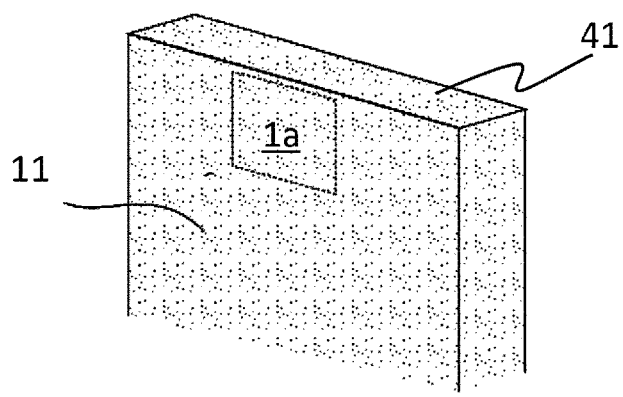
FIG. 43 is a perspective view of a structure in a state where the information display device according to the modification example is attached.

Partition 41 may not have the upper curved portion. For example, as illustrated in FIG. 41, structural body 410 which is the basis of partition 41 has a rectangular upper portion. In structural body 410, recess 410a is formed by depressing a part of the upper portion similar to the example illustrated in FIG. 39, and plate-like body 43 is formed in recess 410a. As illustrated in FIG. 42, display panel 23 is attached to be over plate-like body 43 in recess 410a. Display panel 23 is bent and disposed in a rectangular shape according to the shape of the upper portion of structural body 410 in which recess 410a is formed. As illustrated in FIG. 43, surface member 11 is attached so as to cover display panel 23 and structural body 410.

In addition, similar to the above-described example, the vertical and horizontal length and thickness of display panel 23 are configured to substantially match the vertical and horizontal length and depth of recess 410a. Further, display panel 23 may be formed to have a thickness that does not protrude from the outside of recess 410a, that is, does not protrude from the outer surface of the other parts of structural body 410. Similar to the above-described example, between display panel 23 and surface member 11, a transparent or translucent member (not illustrated) disposed to cover at least the display surface of display panel 23 may be disposed.

In the above embodiment, as shown in FIG. 41. the side portion 43c of the plate body 43 may be formed in a curved shape (or a rounded shape on the corners). With such a configuration, even if the upper portion of the display panel 23 has a right-angled shape, the load generated when the display panel 23 is attached can be reduced.

Modification Example 10-3

The surface member 11 does not have to be arranged on both sides of the structure 410. For example, the front surface member 11 may be arranged on each of the front and back surfaces, the side surfaces, and the top surface of the structure 410 such as a wall. In that case, the surface member 11 on each surface of the structure 410 may be made of different materials. For example, a part or all of the surface member 11 that covers the first mounting surface 43a, the surface member 11 that covers the second mounting surface 43b, and the surface member 11 that covers the side portion 43c of the plate body 43 are made of different materials or patterns.

11. Other Embodiments (1)

Information display devices 1 to 1J may determine the in-flight conditions (meal time, sleep time, before and after takeoff and landing, operation in turbulence, and the like) based on information from a connected in-flight server (not illustrated), and change the contents to be displayed. Since the information is displayed on the wall surface, it is possible to realize an information display device which can perform display without damaging the sense of luxury even when the display contents and the display amount are changed and the region that is not displayed is changed.

Similar to the example illustrated in FIG. 2, information display devices 1 to 1J include touch panel 21, CPU 22, and display panel 23. CPU 22 selects information to be presented to user 13 (FIG. 1) based on information from the in-flight server, and displays optimal information.

According to the above-described operation, in the embodiment, it becomes possible to realize an information display device that can provide information optimal for the user in accordance with the in-flight conditions without damaging the sense of luxury.

In the embodiment, a case where the in-flight conditions are acquired from the in-flight server is employed as an example, but the in-flight conditions may be determined by CPU 22 from a clock built in the information display device, a sensor that detects inclination or vibration, and the like. Further, in a case where there are a plurality of information display devices in the cabin, an optimal information display device may be selected in accordance with the in-flight conditions. For example, when the passenger is eating, an information display device at a position that can be easily seen from the dining table may be selected to display the information.

(2)

Information display devices 1 to 1J may determine the information from the in-flight environment sensor and change the contents to be displayed based on the in-flight environment (temperature, humidity, illuminance, air pressure, and the like). Since the information is displayed on the wall surface, it is possible to realize an information display device which can perform display without damaging the sense of luxury even when the display contents and the display amount are changed and the region that is not displayed is changed.

Similar to the example illustrated in FIG. 2, information display devices 1 to 1J include touch panel 21, CPU 22, and display panel 23. CPU 22 selects information to be presented to user 13 (FIG. 1) based on information from the plurality of sensors (not illustrated) which are disposed in the cabin, and displays optimal information. For example, a button for requesting a blanket is displayed when the temperature drops. Accordingly, it is possible to select information to be presented to user 13 (FIG. 1), and to display optimal information.

According to the above-described operation, in the embodiment, it becomes possible to realize an information display device that can provide information optimal for the user in accordance with the in-flight environment without damaging the sense of luxury.

In the embodiment, a case where the in-flight environment is acquired from the in-flight environment sensor is employed as an example, but the in-flight environment may be determined from a clock or the like built in the in-flight server or the information display device. Further, in a case where there are a plurality of information display devices in the cabin, an optimal information display device may be selected in accordance with the in-flight conditions.

(3)

Figure 44:
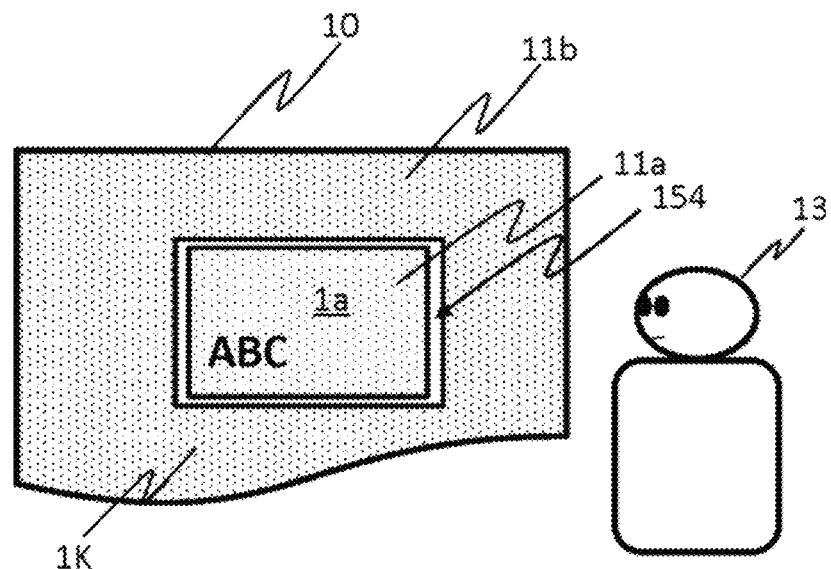
FIG. 44 illustrates a usage environment of the information display device according to another embodiment.

FIG. 44 illustrates a usage aspect of information display device 1K according to the embodiment.

In the usage environment in the embodiment, information display device 1K is disposed on wall surface 10 which is a part of the interior of the aircraft. Information display device 1K transmits the light of the display panel from the back side of surface member 11 and displays information in display region 1a on surface member 11 such that user 13 can be seen. Information display device 1K is characterized in that a film having a designability and light transmitting properties is pasted to the front of the display device, and that the pattern of the film having a designability is the same pattern as that of the wall surface around the display device.

Information display device 1K is used in any usage environment similar to the above-described embodiment. The description of information display device 1K having the same configuration and function as those of the above-described embodiments will be omitted, and the same reference numerals will be given to the same configuration members.

Figure 45:
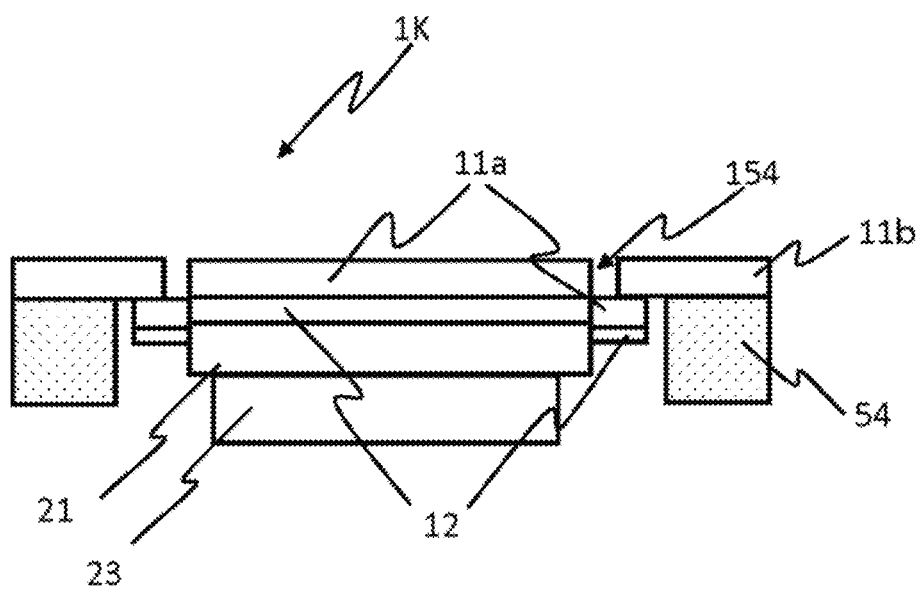
FIG. 45 is a schematic sectional view of the information display device of FIG. 44.

FIG. 45 is a schematic sectional view of information display device 1K of the embodiment. Information display device 1K includes surface member 11a, reflection member (half mirror) 12, structural body 54, touch panel 21, display panel 23, wall surface member 11b, and void 154. Void 154 is formed between surface member 11a and wall surface member 11b, and is formed so as to surround the outer edge of display panel 23. The front side of surface member 11a and the front side of wall surface member 11b are decorated with the same pattern. As illustrated in FIG. 45, surface member 11a and reflection member 12 are disposed on the bottom surface of void 154. Accordingly, the boundary between wall surface member 11b and surface member 11a can be made prominent. The member to be pasted to the bottom surface of void 154 may be wall surface member 11b.

In order to realize an information display device in which display region 1a and other parts can be seen seamlessly, it is preferable that void 154 is not present. However, by providing void 154, during the maintenance, only surface member 11a can be detached from wall surface 10 and only display panel 23 or touch panel 21 can be picked up.

It is preferable that void 154 has a width that does not hinder removal. For example, when the void has a width of approximately 0.5 mm to 2 mm, it is considered that both aesthetic appearance and practicality can be achieved.

With the above-described configuration, information display device 1K according to the embodiment does not allow user 13 to feel the position and the presence of display panel 23, can detach and replace only the display panel 23 without peeling off the entire wall in the event of a failure. Accordingly, information display device 1K can make the maintenance simple while realizing a seamless design in which the joints are not visually prominent.

(4)

In the above-described embodiment, the surface member 11 may include a transparent member, even if not particularly described. In this case, the transparent member may have same configuration and function as the transparent member 53 of the third embodiment and the like.

(5)

In the above-described embodiment, a part or the entirety of processing of each functional block may be realized by a program. A part or the entirety of processing of each functional block may be executed by a processor in a computer. A program for performing each processing may be stored in a storage device such as a hard disk or a ROM, and may be read and executed on the ROM or the RAM.

In the above-described embodiment, a processor formed by a dedicated electronic circuit designed to realize a predetermined function may be included instead of the CPU. Further, instead of the CPU, the functions may be realized by various processors such as an MPU, a GPU, a DSP, an FPGA, and an ASIC. The processor may be formed by one or more processors.

In the above-described embodiment, an example has been described in which information display devices 1 to 1J are installed in the aircraft. However, the disclosure is not limited thereto. The location where information display devices 1 to 1J are installed may be other moving objects or vehicles such as trains, buses, ships, and the like.

As described above, the above-described embodiments have been described as an example of the technology disclosed in the application. However, the technology in the disclosure is not limited thereto, and can be applied to embodiments in which changes, replacements, additions, omissions, and the like are appropriately made. Further, it is also possible to achieve a new embodiment by combining each configuration elements described in the above-described embodiments.

REFERENCE NUMERALS

1-1K: Information Display Device, 2: In-flight Server, 11,11a: Surface Member, 11b: Wall Surface Member, 12: Reflection Member, 13: User, 20: Display Device, 21:

Touch Panel, 22: CPU, 23: Display Panel, 23a: first Display Surface, 23b: Second Display Surface, 23c: Curved Portion, 26: Seat Monitor, 28: Ambient Light Sensor, 32: Slight-Adhesive Layer, 33: Reflection Layer, 35: Structural Body, 37: Cushion Sheet, 38: Fixing Member, 40: Decorative Film, 41: Partition, 41a: Surface, 41b: Surface, 42: Light-transmitting Plate, 43: Plate-like Body, 43a: First Mounting Surface, 43b: Second Mounting Surface, 43c: Side Portion, 53: Transparent Member, 54: Structural Body, 55: Space, 57: Housing, 58: Film, 59: Film, 60: Base Member, 61: Ceiling, 71: First Layer, 72: Second Layer, 82: transparent Member, 83: Mask Print Layer, 83a: Outer Edge, 83b: Inner Edge, 85: Reflection Layer, 93: Crew, 94: Wall Surface, 100: Structure, 100a: Structural Body, 101: Seat, 105a: Retainer, 105b: Retainer, 106: Screw, 110: Plate-like Member, 120: Reflectance Variable Reflection Layer, 121: Reflection Layer, 122: Door Surface, 154: Void, 231: Display Surface, 410: Structural Body, 410a: Recess

What is claimed is:

1. An information display device attachable to a structure, the information display device comprising:
a display panel that has a display surface and is configured to display information on the display surface;
a surface member that is disposed on a display surface side of the display panel and has a larger surface area than the display panel; and
a structural body that is attached to a back side of the surface member,
wherein;
when the display panel is turned on, only the information displayed on the display surface of the display panel becomes visible through the surface member;
the structural body has a retainer for fixing the information display device to the structure at a position not visible from a front side of the surface member such that the surface member and the structure are configured to form a flat surface; and
at least a surface member side of the structural body is colored with gray, white or black, which is the same color as the display surface when the display panel is turned off.

2. The information display device of claim 1, wherein the front side of the surface member is decorated by a film, painting or printing.

3. The information display device of claim 1, wherein the front side of the surface member is made of the same material as a surface of the structure.

4. The information display device of claim 1, wherein, when the display panel is turned off or when information is not displayed on the display surface of the display panel, the display panel becomes invisible through the surface member.

5. The information display device of claim 1, wherein a light transmittance of the surface member is 8% to 15%.

6. The information display device of claim 1, wherein the display panel has a screen luminance of 200 cd/m$^2$ or less after transmission through the surface member.

7. The information display device of claim 1, wherein the display panel has a luminance of the display surface adjusted to 800 cd/m$^2$ or more.

8. The information display device of claim 1, wherein the structural body is disposed at a position that does not overlap the display surface of the display panel.

9. The information display device of claim 1, further comprising:
a touch panel disposed between the display panel and the surface member; and
a cushion member disposed to be peelable between the surface member and the touch panel, formed of a material that has light transmitting properties, and configured to deform when a force is applied thereto.

10. The information display device of claim 9, further comprising:
a non-adhesive layer that is disposed on at least one of front side and a back side of the cushion member and configured to prevent the cushion member from adhering to the surface member or the touch panel.

11. The information display device of claim 1, wherein the structure is a wall, a ceiling, a door of a container, or a seat disposed in a movable object, and the information display device is adapted to be disposed at a position visible from a passenger or a crew of the movable object.

12. The information display device of claim 1, wherein the information display device is adapted to be disposed at a position higher than a user's shoulder and in front of the user's ear position, and within 50 cm from a center of the user's face.

13. The information display device of claim 1, wherein the information display device is adapted to be disposed at a position visible from a reclining user when a seat for the reclining user is set to a bed mode.

14. An information display device attachable to a structure, the information display device comprising:
a display panel that has a display surface and is configured to display information on the display surface;
a surface member that is disposed on a display surface side of the display panel and has a larger surface area than the display panel; and
a structural body that is attached to a back side of the surface member,
wherein:
when the display panel is turned on, only the information displayed on the display surface of the display panel becomes visible through the surface member;
the structural body has a retainer for fixing the information display device to the structure at a position not visible from a front side of the surface member such that the surface member and the structure are configured to form a flat surface; and
between the display panel and the surface member, a region that surrounds the display surface has a colored layer colored with gray, white or black, which is the same color as the display surface when the display panel is turned off.

15. The information display device of claim 14, wherein the colored layer has a higher light transmittance when getting closer to the display surface.

16. The information display device of claim 14, wherein an edge of the colored layer has a rounded shape with an arc-shaped corner.

* * * * *